United States Patent
Bogdanov et al.

(10) Patent No.: US 11,072,289 B2
(45) Date of Patent: Jul. 27, 2021

(54) VEHICLE INTERIOR COMPONENT

(71) Applicant: Shanghai Yanfeng Jinqiao Automotive Trim Systems Co. Ltd., Novi, MI (US)

(72) Inventors: Natalie Bogdanov, Langenfeld (DE); Norbert Truxa, Düsseldorf (DE); Lucas Eyl, Wuppertal (DE); Jesus Maria Galan Garcia, Düsseldorf (DE); Bogdan Muresan, Neuss (DE)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 17/094,237

(22) Filed: Nov. 10, 2020

(65) Prior Publication Data
US 2021/0053499 A1 Feb. 25, 2021

Related U.S. Application Data

(63) Continuation of application No. PCT/US2020/014473, filed on Jan. 21, 2020.
(Continued)

(51) Int. Cl.
*B60R 7/00* (2006.01)
*B60Q 3/80* (2017.01)
(Continued)

(52) U.S. Cl.
CPC .............. *B60R 7/005* (2013.01); *B60K 37/00* (2013.01); *B60Q 3/20* (2017.02); *B60Q 3/80* (2017.02);
(Continued)

(58) Field of Classification Search
CPC ........... B60R 7/005; B60R 7/046; B60R 7/06; B60N 3/108; B60N 2/77; B60N 2/793; B60N 3/102
(Continued)

(56) References Cited

U.S. PATENT DOCUMENTS 4,659,135 A * 4/1987 Johnson .................. B60N 2/77
                                                296/153
5,658,050 A   1/1997 Lorbiecki
              (Continued)

FOREIGN PATENT DOCUMENTS

CN    104310079     1/2015
DE    102005052526  5/2007
              (Continued)

OTHER PUBLICATIONS

International Search Report and Written Opinion for International Application No. PCT/US20/14473 dated Apr. 16, 2020, 27 pages.

*Primary Examiner* — D Glenn Dayoan
*Assistant Examiner* — E Turner Hicks
(74) *Attorney, Agent, or Firm* — Amin, Turocy & Watson, LLP

(57) ABSTRACT

A vehicle interior component is disclosed. The component may comprise a base and a support. The component may comprise an actuator to operate a mechanism to move the support between raised and lowered positions. The mechanism may comprise a bladder. The support and the base may provide a cavity when the support is lowered. The support may protrude from the base when the support is raised. The support may be configured for a tilted state. The bladder may expand and/or contract to move the support. The bladder may comprise a first and second air bladder. An outer surface of the support and an outer surface of the base may comprise a substantially continuous surface when the support is in the raised or lowered position. The component may comprise at least one of a console; a floor console; a tunnel console; an armrest; an instrument panel; a door; a door panel.

20 Claims, 28 Drawing Sheets

Related U.S. Application Data

(60) Provisional application No. 62/795,314, filed on Jan. 22, 2019.

(51) Int. Cl.
  B60Q 3/20 (2017.01)
  B60K 37/00 (2006.01)
  B60R 7/04 (2006.01)
  B60R 16/00 (2006.01)
  B60N 2/75 (2018.01)
  B60N 3/10 (2006.01)
  B60R 7/06 (2006.01)

(52) U.S. Cl.
  CPC .............. B60R 7/04 (2013.01); B60R 16/005 (2013.01); B60N 2/77 (2018.02); B60N 2/793 (2018.02); B60N 3/102 (2013.01); B60N 3/108 (2013.01); B60R 7/046 (2013.01); B60R 7/06 (2013.01)

(58) Field of Classification Search
  USPC .................. 296/37.8, 24.34, 1.08, 37.12
  See application file for complete search history.

(56) References Cited

U.S. PATENT DOCUMENTS

| | | | |
|---|---|---|---|
| 5,816,645 A * | 10/1998 | Grimes .................. | B60N 2/77 296/153 |
| 5,975,629 A | 11/1999 | Lorbiecki | |
| 6,302,364 B1 | 10/2001 | Chiueh et al. | |
| 7,252,313 B2 | 8/2007 | Browne et al. | |
| 7,370,894 B2 | 5/2008 | Browne et al. | |
| 7,537,268 B2 | 5/2009 | Becket et al. | |
| 7,637,559 B2 | 12/2009 | Browne et al. | |
| 7,669,918 B2 | 3/2010 | Buravalla et al. | |
| 7,686,382 B2 | 3/2010 | Rober et al. | |
| 7,694,928 B2 | 4/2010 | Lee et al. | |
| 7,748,769 B2 * | 7/2010 | Sommer .................. | B60N 2/77 296/153 |
| 7,893,645 B2 | 2/2011 | Kneller et al. | |
| 7,931,322 B2 | 4/2011 | O'Brien et al. | |
| 7,997,632 B2 | 8/2011 | Browne et al. | |
| 8,256,829 B2 | 9/2012 | Browne et al. | |
| 8,485,581 B2 | 7/2013 | McKnight et al. | |
| 8,510,924 B2 | 8/2013 | Mankame et al. | |
| 8,579,149 B2 | 11/2013 | Henke et al. | |
| 8,870,144 B2 | 10/2014 | Zavattieri et al. | |
| 9,358,930 B1 | 6/2016 | Sic | |
| 9,539,942 B2 | 1/2017 | Salter et al. | |
| 9,583,968 B2 | 2/2017 | Salter et al. | |
| 9,722,456 B2 | 8/2017 | Lambert et al. | |
| 10,099,594 B2 | 10/2018 | Salinas et al. | |
| 10,259,370 B2 | 4/2019 | Filipovich et al. | |
| 10,315,551 B2 | 6/2019 | Filipovich et al. | |
| 10,506,890 B2 * | 12/2019 | Sawada .............. | A47G 23/0216 |
| 2007/0204629 A1 * | 9/2007 | Lofy ....................... | B60N 3/108 62/3.61 |
| 2008/0149300 A1 * | 6/2008 | Matsukawa ........... | B60N 3/106 165/43 |
| 2008/0290125 A1 | 11/2008 | Lee et al. | |
| 2009/0224564 A1 | 9/2009 | O'Brien et al. | |
| 2009/0244917 A1 | 10/2009 | Davie et al. | |
| 2012/0091157 A1 | 4/2012 | Henke et al. | |
| 2013/0049389 A1 | 2/2013 | Hipshier | |
| 2013/0106346 A1 | 5/2013 | Salter et al. | |
| 2016/0023594 A1 | 1/2016 | Salter et al. | |
| 2016/0276865 A1 | 9/2016 | Pike et al. | |
| 2016/0339848 A1 | 11/2016 | Hodgson | |
| 2017/0077739 A1 | 3/2017 | Jouper et al. | |
| 2017/0144613 A1 | 5/2017 | Catlin et al. | |
| 2017/0258252 A1 | 9/2017 | Sawada et al. | |
| 2018/0029514 A1 | 2/2018 | Salinas et al. | |
| 2018/0222373 A1 * | 8/2018 | Filipovich .............. | B60N 3/108 |

FOREIGN PATENT DOCUMENTS

| | | |
|---|---|---|
| DE | 102008030102 | 12/2009 |
| DE | 102015222685 | 5/2017 |
| GB | 2414169 | 11/2005 |
| JP | 3644567 | 4/2005 |
| JP | 4611793 | 1/2011 |
| JP | 2013107456 | 6/2013 |
| JP | 6342368 | 6/2018 |
| KR | 20180068397 | 6/2018 |
| TW | M512131 U | 11/2015 |
| WO | 2001017393 | 3/2001 |

* cited by examiner

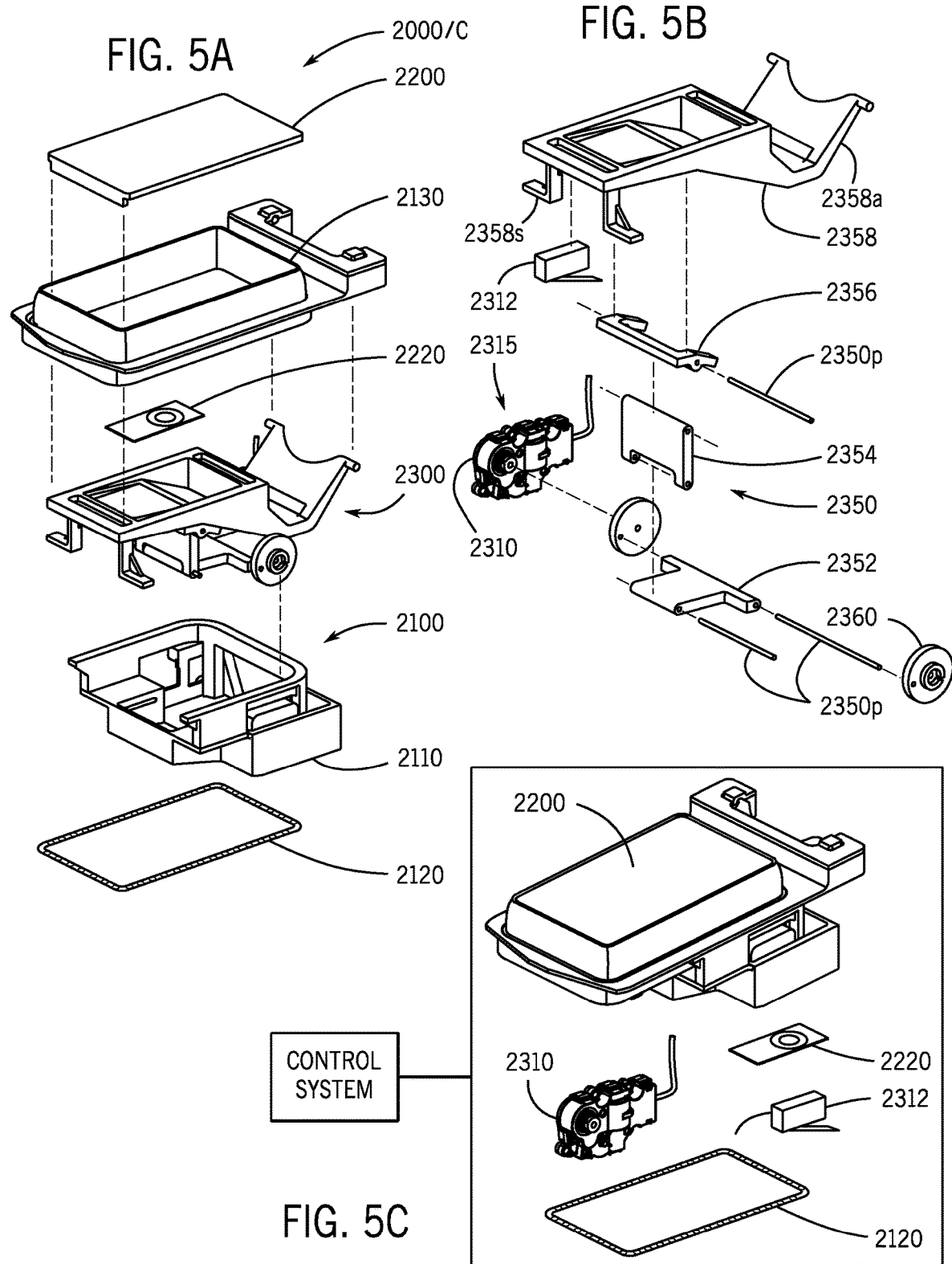

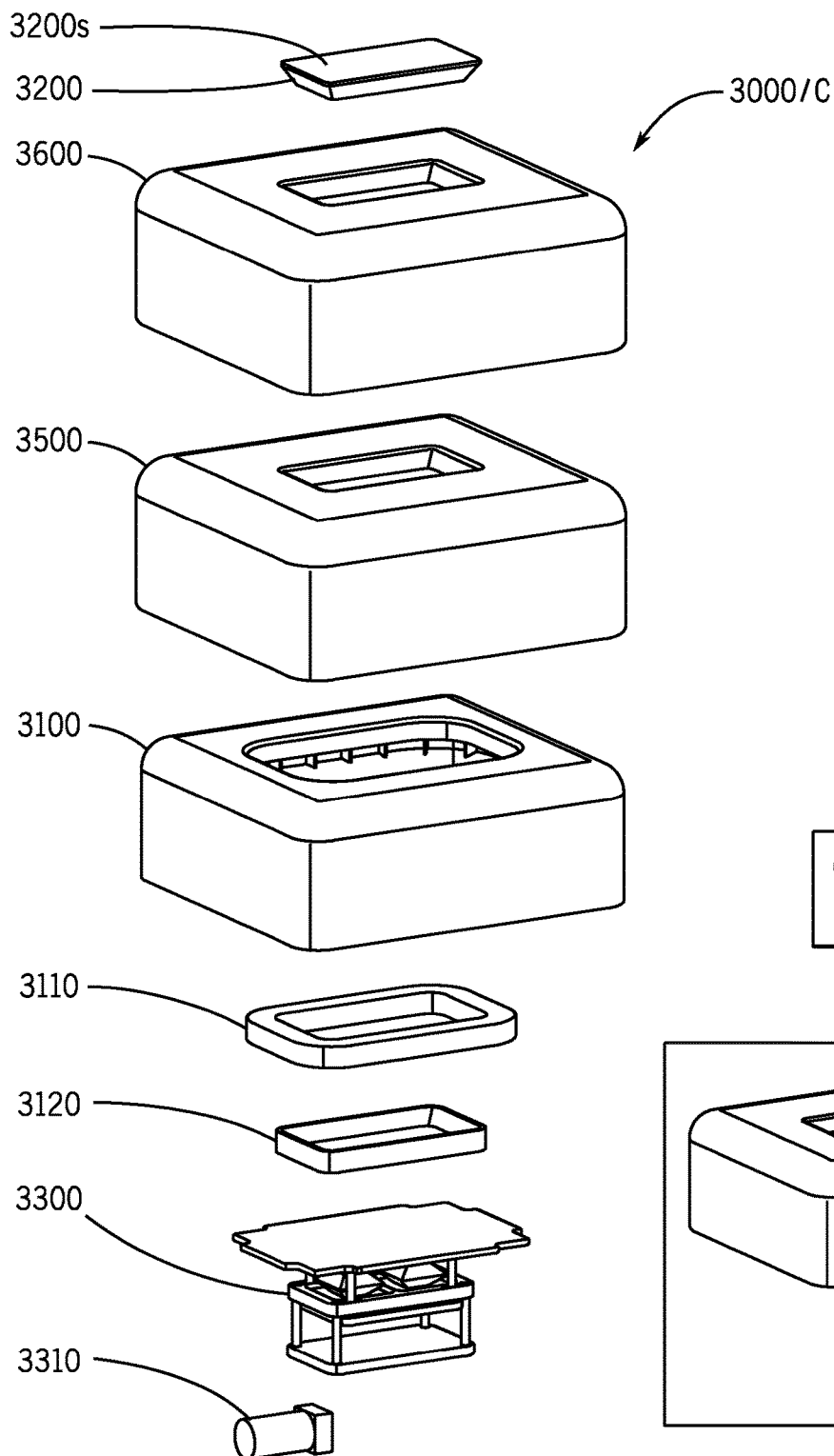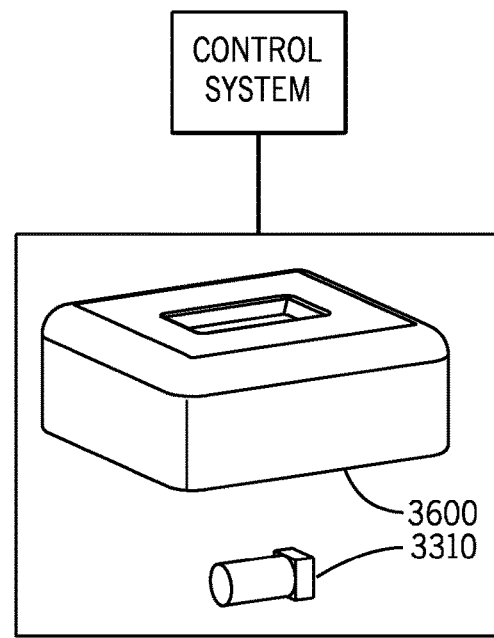
FIG. 8A
FIG. 8B

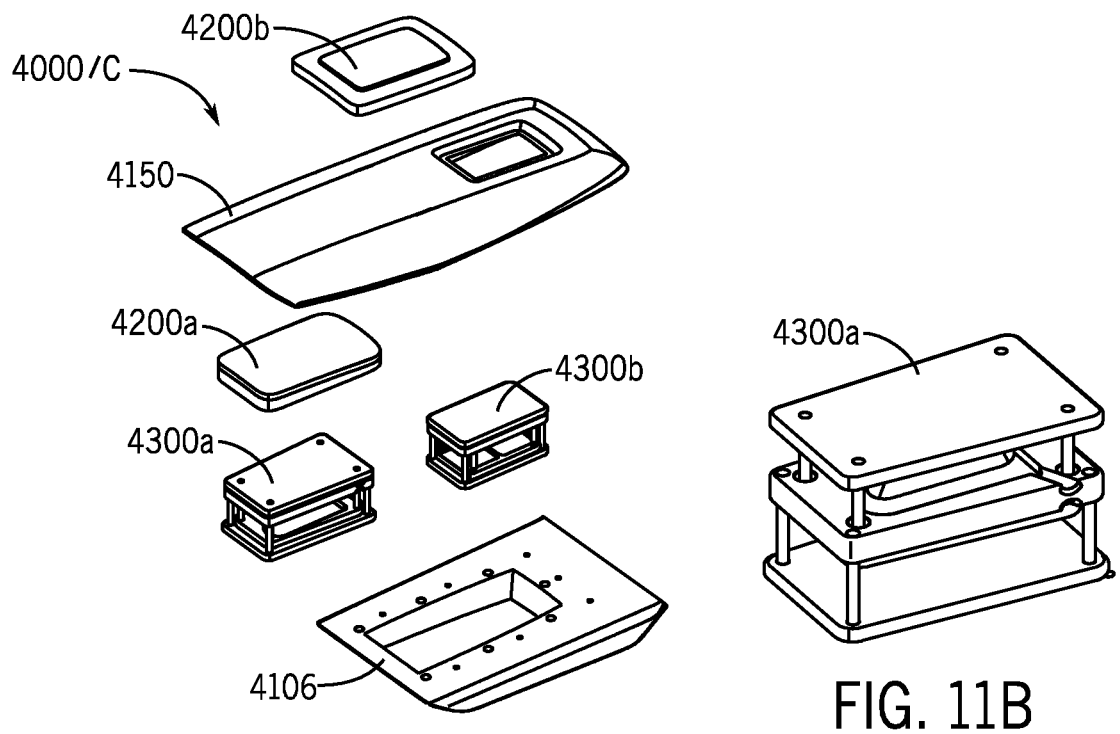
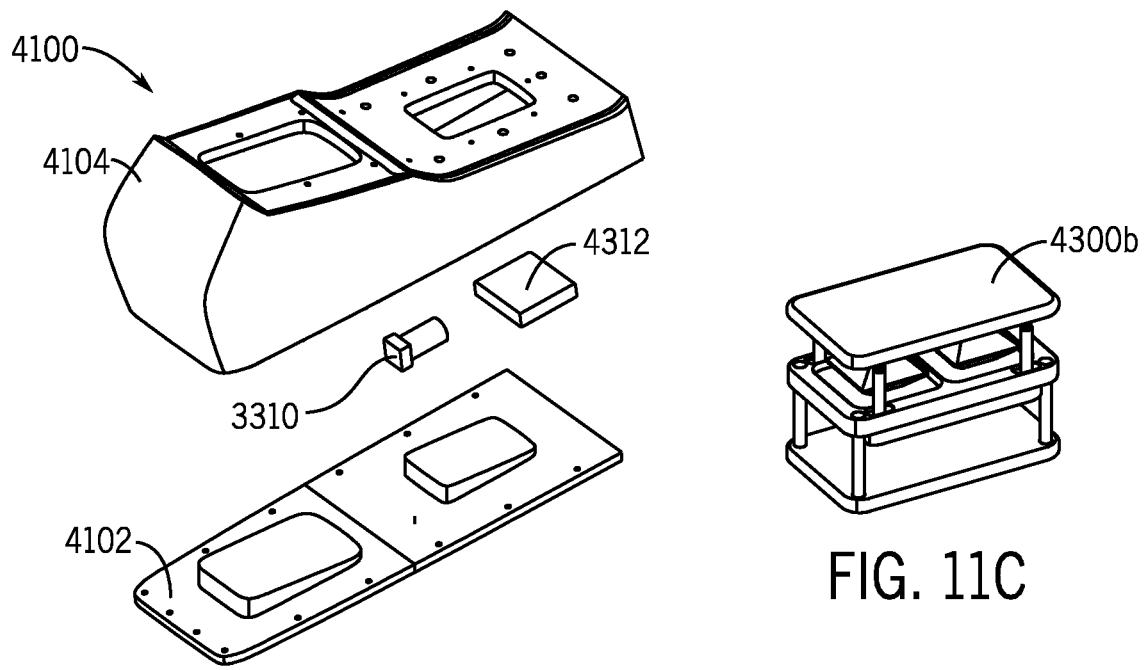
FIG. 11A
FIG. 11B
FIG. 11C

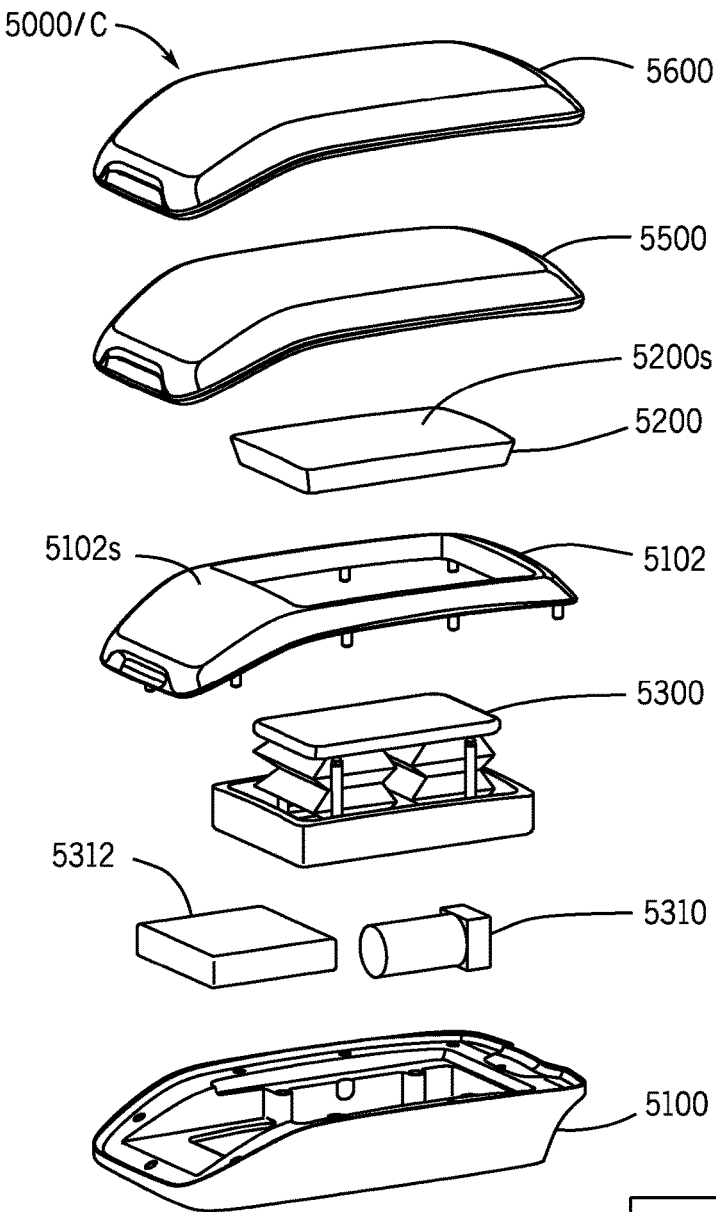
FIG. 15A
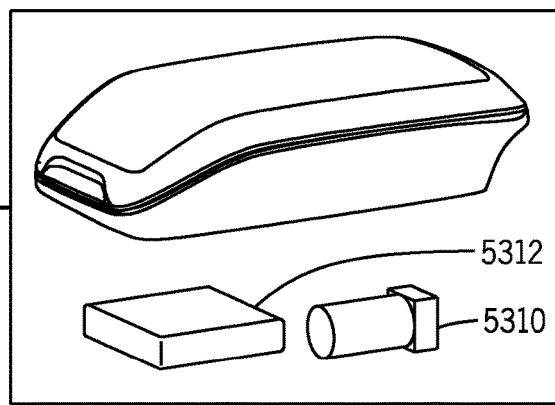
FIG. 15B

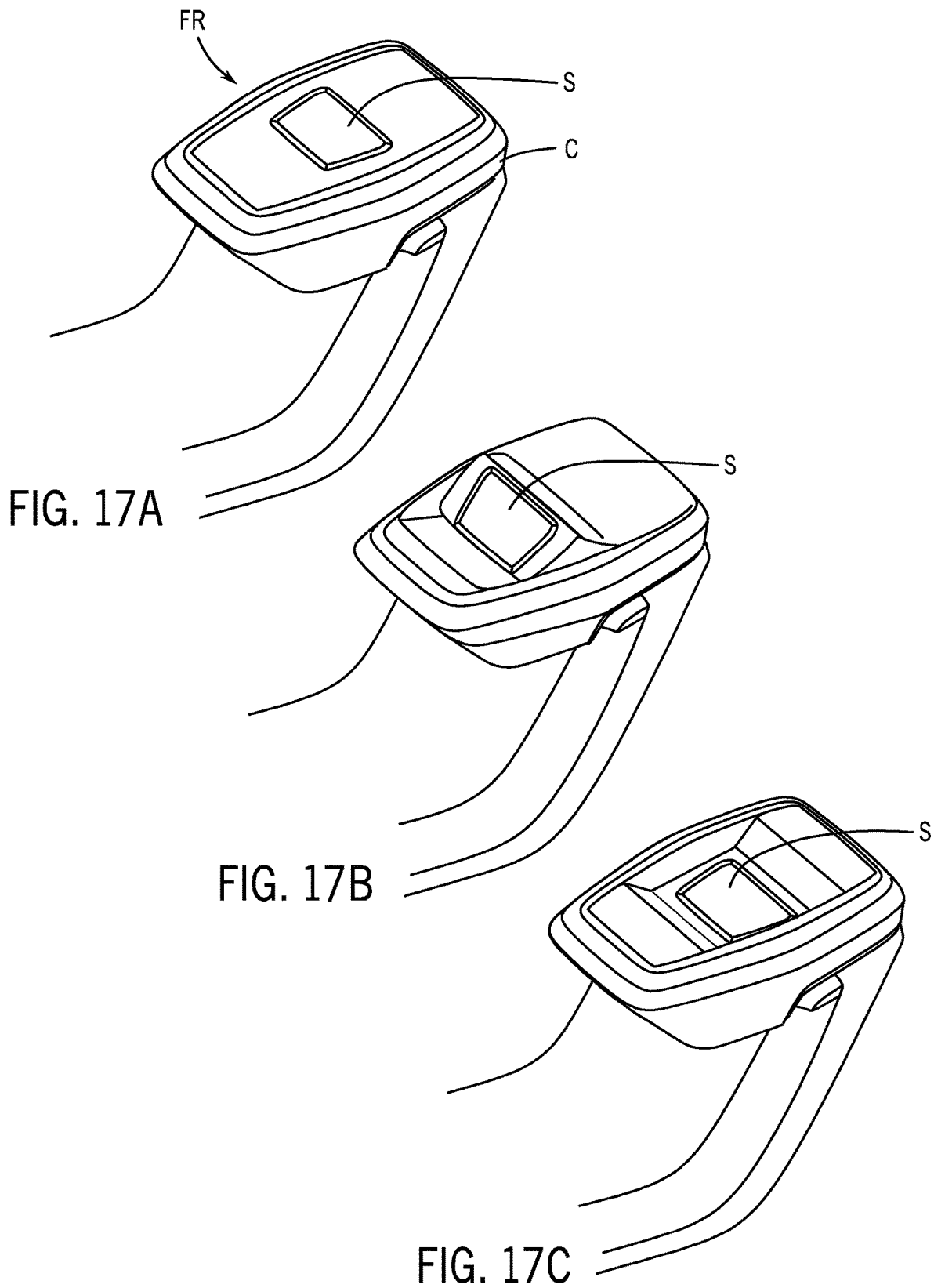

VEHICLE INTERIOR COMPONENT

CROSS-REFERENCE TO RELATED APPLICATION

The present application is a continuation of PCT/International Patent Application No. PCT/US2020/14473 titled "VEHICLE INTERIOR COMPONENT" filed Jan. 21, 2020, which claims the benefit of U.S. Provisional Patent Application No. 62/795,314 titled "VEHICLE INTERIOR COMPONENT" filed Jan. 22, 2019.

The present application claims priority to and incorporates by reference in full the following patent applications: (a) U.S. Provisional Patent Application No. 62/795,314 titled "VEHICLE INTERIOR COMPONENT" filed Jan. 22, 2019; (b) PCT/International Patent Application No. PCT/US2020/14473 titled "VEHICLE INTERIOR COMPONENT" filed Jan. 21, 2020.

FIELD

The present invention relates to a vehicle interior component.

BACKGROUND

It is known to provide a vehicle interior component with a support (e.g. an armrest, a support for a mobile device, a cup holder, etc.)

It would be advantageous to provide an improved vehicle interior component comprising a support moveable between multiple positions.

SUMMARY

The present invention relates to a component for a vehicle interior comprising a base comprising an outer surface; a support comprising an outer surface and configured to move between a raised position and a lowered position; and a mechanism configured to move the support between the raised position and the lowered position. The support and the base may provide a cavity when the support is in the lowered position. The outer surface of the support and the outer surface of the base may comprise a substantially continuous surface when the support is in the raised position. The mechanism may comprise at least one air bladder. The at least one air bladder may be configured to at least one of (a) expand to move the support; (b) contract to move the support. The at least one air bladder may comprise a first air bladder and a second air bladder. The first air bladder may be configured to contract to move the support from the raised position to the lowered position. The second air bladder may be configured to expand to move the support from the raised position to the lowered position. The at least one air bladder may comprise a first upper air bladder, a second upper air bladder, a first lower air bladder and a second lower air bladder. The first upper air bladder and the second upper air bladder are configured to contract to move the support from the raised position to the lowered position. The first lower air bladder and the second lower air bladder are configured to expand to move the support from the raised position to the lowered position. The first upper air bladder may be configured to contract and the second lower air bladder may be configured to expand to rotate the support relative to the base as the support descends into the base.

The present invention relates to a component for a vehicle interior comprising a base comprising an outer surface; and a support comprising an outer surface and configured to move between a raised position and a lowered position. The outer surface of the support and the outer surface of the base may comprise a substantially continuous surface when the support is in the raised position. The support may comprise a front portion and a rear portion. The support may be configured for a tilted state with the rear portion of the support descended into the base and the front portion of the support extending from the base. The component may comprise a first actuator; a second actuator and a bracket coupled to the support, the first actuator and the second actuator. The first actuator and the second actuator are configured to (a) rotate the bracket to rotate the support; (b) translate the bracket to translate the support. The component may comprise a first actuator; a second actuator; a bracket coupled to the support, the first actuator and the second actuator; a cover; a frame and a gasket coupled to the frame. The cover and the gasket may be configured to move with the support and the bracket relative to the frame. The support may be configured to extend through at least one aperture in the cover and at least one aperture in the gasket to couple with the bracket. The component may comprise an actuator configured to operate a mechanism; the mechanism may comprise a bladder.

The present invention relates to a component for a vehicle interior comprising a base comprising an outer surface; a support comprising an outer surface and configured to move between a raised position and a lowered position; and a mechanism configured to move the support between the raised position and the lowered position. The outer surface of the support and the outer surface of the base may comprise a substantially continuous surface when the support is in the lowered position. The support may be configured to protrude from the base when the support is in the raised position. The mechanism may comprise at least one air bladder. The at least one air bladder may be configured to at least one of (a) expand to move the support; (b) contract to move the support. The at least one air bladder may comprise a first air bladder and a second air bladder. The first air bladder may be configured to expand to move the support from the lowered position to the raised position. The second air bladder may be configured to contract to move the support from the raised position to the lowered position.

The present invention relates to a component for a vehicle interior comprising a base comprising an outer surface; and a support comprising an outer surface and configured to move between a raised position and a lowered position; the outer surface of the support and the outer surface of the base may comprise a substantially continuous surface when the support is in (a) the raised position; or (b) the lowered position. The outer surface of the support and the outer surface of the base may comprise a substantially continuous surface when the support is in the raised position. The component may comprise a light source configured to provide a lighted border around the support. The support may be configured to descend into the base to provide a cavity. The component may comprise a light source configured to (a) provide a lighted border around the support when the support is in the raised position; (b) illuminate walls of the cavity. The component may comprise a mechanism configured to move the support between the raised position and the lowered position; the support and the base may provide a cavity when the support is in the lowered position. The support may comprise a switch configured to send a signal to the mechanism to move the support toward the lowered position in response to a force on the support. The mechanism may comprise a controller configured to hold the support in the lowered position for a duration of time after removal of the force on the support. The mechanism may comprise a controller configured to send a signal to the mechanism to move the support toward the raised position after a duration of time after removal of the force on the support. The support further may comprise a top plate; a bottom plate; a spring. The spring may be configured to separate the top plate and bottom plate; the spring may be configured to compress in response to the force on the support. The mechanism may comprise a limit switch configured to send a signal to the mechanism to stop movement of the support when the support is in the lowered position. The mechanism may comprise a scissor link. The mechanism may comprise a motor, a gear and an arm; the motor may be configured to rotate the gear; the gear may be configured to move the arm; the arm may be configured to at least one of (a) compress the scissor link; (b) extend the scissor link. The support may comprise a slot configured to guide movement of the scissor link. The base may comprise a slot configured to guide movement of the scissor link. The support may comprise a front portion and a rear portion; the front portion of the support may be configured to descend into the base by a first distance; the rear portion of the support may be configured to descend into the base by a second distance; the second distance may be greater than the first distance. The support may be configured to rotate relative to the base as the support descends into the base. The support may be configured to rotate and translate relative to the base as the support descends into the base. The support may be configured to (a) rotate relative to the base as the support descends into the base; (b) translate relative to the base as the support descends into the base. The support may comprise a sensor configured to sense an electronic device; the sensor may be configured to send a signal to the mechanism to move the support toward the lowered position when the sensor senses an electronic device. The sensor may comprise a wireless charging device. The mechanism may comprise a controller configured to hold the support in the lowered position for a duration of time after the sensor senses absence of the electronic device. The mechanism may comprise a controller configured to send a signal to the mechanism to move the support toward the raised position after a duration of time after the sensor senses absence of the electronic device. The support may comprise an arm coupled to the base at a joint; the joint may be spaced away from the outer surface of the support. The mechanism may comprise a motor and a link; the motor may be configured to rotate the link to move the outer surface of the support. The link may comprise a first link and a second link. The support may comprise a stop configured to stop movement of the support from the lowered position beyond the raised position. The component may comprise a cover; the cover may be configured to move with the support as the support moves between the raised position and the lowered position. The cover may be configured to extend as the support moves from the raised position toward the lowered position. The cover may be configured to contract as the support moves from the lowered position toward the raised position. The cover may comprise a decorative layer and a support layer. The mechanism may comprise at least one air bladder. The at least one air bladder may be configured to at least one of (a) expand to move the support; (b) contract to move the support. The at least one air bladder may comprise a first air bladder and a second air bladder. The first air bladder may be configured to contract to move the support from the raised position to the lowered position. The second air bladder may be configured to expand to move the support from the raised position to the lowered position. The at least one air bladder may comprise a first upper air bladder, a second upper air bladder, a first lower air bladder and a second lower air bladder. The first upper air bladder and the second upper air bladder may be configured to contract to move the support from the raised position to the lowered position. The first lower air bladder and the second lower air bladder may be configured to expand to move the support from the raised position to the lowered position. The first upper air bladder may be configured to contract and the second lower air bladder may be configured to expand to rotate the support relative to the base as the support descends into the base. The support may be configured to rotate relative to the base to provide a cavity. The support may comprise a front portion and a rear portion; the support may be configured for a tilted state with the rear portion of the support descended into the base and the front portion of the support extending from the base. The component may comprise a first actuator; a second actuator and a bracket coupled to the support, the first actuator and the second actuator. The first actuator and the second actuator may be configured to (a) rotate the bracket to rotate the support; (b) translate the bracket to translate the support. The component may comprise a cover; a frame and a gasket coupled to the frame. The cover and the gasket may be configured to move with the support and the bracket relative to the frame. The support may be configured to extend through at least one aperture in the cover and at least one aperture in the gasket to couple with the bracket. The outer surface of the support and the outer surface of the base may comprise a substantially continuous surface when the support is in the lowered position. The outer surface of the support and the outer surface of the base may comprise a substantially planar surface when the support is in the lowered position. The component may comprise a cover; the cover may be configured to move with the support as the support moves between the raised position and the lowered position. The cover may be configured to extend as the support moves from the lowered position toward the raised position. The cover may be configured to contract as the support moves from the raised position toward the lowered position. The cover may comprise a decorative layer and a support layer. The cover may comprise at least one of (a) an elastomer; (b) an olefin: (c) a thermoplastic material; (d) a synthetic rubber; (e) neoprene; (f) a thermoplastic olefin; (g) a thermoplastic elastomer. The cover may be configured to provide a force to move the support from the raised position toward the lowered position. The component may comprise a mechanism configured to move the support between the raised position and the lowered position; the support may be configured to protrude from the base when the support is in the raised position. The mechanism may comprise at least one air bladder. The at least one air bladder may be configured to at least one of (a) expand to move the support; (b) contract to move the support. The at least one air bladder may comprise a first air bladder and a second air bladder. The first air bladder may be configured to expand to move the support from the lowered position to the raised position. The second air bladder may be configured to contract to move the support from the raised position to the lowered position. The at least one air bladder may comprise a first upper air bladder, a second upper air bladder, a first lower air bladder and a second lower air bladder. The first upper air bladder and the second upper air bladder may be configured to expand to move the support from the lowered position to the raised position. The first lower air bladder and the second lower air bladder may be configured to contract to move the support from the lowered position to the raised position. The second upper air bladder may be configured to expand and the second lower air bladder may be configured to contract to rotate the support relative to the base as the support moves from the lowered position toward the raised position. The mechanism may comprise at least one pneumatic actuator. The mechanism may comprise at least one pump and at least one valve. The support may comprise a first support configured to move between a lowered position and a raised position and a second support configured to move between a lowered position and a raised position; the first support may comprise an outer surface and the second support may comprise an outer surface; the outer surface of the first support, the outer surface of the second support and the outer surface of the base may comprise a substantially continuous surface when the first support is in the lowered position of the first support and the second support is in the lowered position of the second support. The first support may be configured to move between the lowered position of the first support and the raised position of the first support when the second support is in the lowered position of the second support or the raised position of the second support. The first support may be configured to translate relative to the base as the first support moves between the lowered position of the first support and the raised position of the first support. The second support may be configured to rotate relative to the base as the second support moves between the lowered position of the second support and the raised position of the second support. The component may comprise a first mechanism configured to move the first support and a second mechanism configured to move the second support. The component may comprise a pump and a valve; the pump and the valve may be configured to actuate (a) the first mechanism; (b) the second mechanism. The component may comprise a cover; the first support may be configured to cover the cover; the cover may be configured to cover the second support. The component may comprise a cover; the cover may be configured to extend as (a) the first support moves from the lowered position of the first support toward the raised position of the first support; (b) the second support moves from the lowered position of the second support toward the raised position of the second support. The component may comprise a bin and a lid configured to move between (a) a closed position to cover the bin and (b) an open position to uncover the bin; the lid may comprise the base and the support. The support may be configured to move between the raised position and the lowered position when the lid is in the closed position and the open position. The component may comprise at least one of (a) a console; (b) a floor console; (c) a tunnel console; (d) an armrest; (e) an instrument panel; (f) a door; (g) a door panel. The base may comprise a functional region providing the substantially continuous surface; the functional region may be configured to present a first form and a second form; the first form may comprise a default volume for the base; the second form may comprise an expanded volume for the base. The base may comprise a functional region providing the substantially continuous surface; the functional region may be configured to present a first form and a second form; in the first form the base may be configured to occupy a default volume in the vehicle interior; in the second form the base may be configured to comprise an enlarged volume larger than the default volume. The second form may comprise a reduced volume smaller than the default volume. The first form may comprise the default volume. The first form may comprise a first shape and the second form may comprise a second shape. The functional region may comprise an adaptive volume mechanism. The base may comprise a functional region providing the substantially continuous surface; the functional region may be configured to present a first form and a second form; the second form may comprise a receptacle in the base; the first form may comprise the absence of the receptacle for the second form. The functional region may comprise a platform movable relative to the base. The platform may comprise an illuminated platform. The platform may be configured for movement relative to the base between an elevated state and a lowered state. The platform may be configured to be presented at a first orientation and a second orientation; in the first orientation the platform may be generally horizontal; in the second orientation the platform may be generally tilted. The first form may comprise a default form. The base may comprise a cover providing an exterior surface; the exterior surface may be substantially continuous when in the default form; the exterior surface may provide a receptacle when in the second form. The platform may be in an elevated state for the default form; the platform may be in a lowered state for the second form. The component may comprise a control system configured to operate the functional region. The component may comprise an actuator configured to operate the functional region; the control system may be configured to operate the actuator. The component may comprise a sensor for the control system. The control system may be configured to operate the functional region in a cycle; the cycle may comprise detection of an object; the cycle may comprise configuring the functional region to the second form; the cycle may comprise returning the functional region to the first form. The object may comprise at least one of a container and/or an electronic device; detection of the object may comprise at least one of detection of a force and/or detection of an electronic signal. The electronic signal may comprise detection of wireless charging capability for the electronic device; the functional region may comprise wireless charging capability. The control system may be configured to provide a first illumination in a segment of the functional region when the object is in a first state and a second illumination when the object is in a second state; the first state may comprise the object adjacent to the segment; the second state may comprise the object at the segment. The component may comprise an actuator configured to operate a mechanism for the functional region; the mechanism may comprise a linkage; the actuator may comprise a motor. The component may comprise an actuator configured to operate a mechanism for the functional region; the actuator may comprise a pneumatic actuator; the mechanism may comprise a bladder.

The present invention relates to a component for a vehicle interior comprising: a base structure comprising a functional region; the functional region may be configured to present a first form and a second form; the second form may comprise a receptacle in the base structure. The functional region may comprise a base movable relative to the base structure. The functional region may comprise a platform movable relative to the base structure. The platform may comprise an illuminated platform. The base structure may comprise an illuminated section for the functional region. The base structure may comprise an illuminated section at the functional region. The illuminated section may comprise a perimeter of the functional region. The second form may comprise an in-use form. The in-use form may comprise providing the receptacle for an object. The first form may comprise a default form. The functional region may be in the default form when not in use. The default form may comprise the absence of the receptacle for the second form. The base structure may comprise a cover providing an exterior surface. The exterior surface may be substantially continuous when in the default form; the exterior surface may provide a receptacle when in the second form. The component may comprise a control system configured to operate the functional region. The component may comprise an actuator configured to operate the functional region. The component may comprise a control system configured to operate the actuator. The control system may be configured to operate the functional region in a cycle; the cycle may comprise at least one of (a) detection of an object; (b) configuring the functional region to the second form; (c) returning the functional region to the default form. The component may comprise a sensor for the control system. The sensor may comprise a detector. The sensor may be configured for detection of an object. The object may comprise at least one of (a) a container; (b) an electronic device. Detection of the object may comprise at least one of (a) detection of a force; (b) detection of a mass of the object. The second form of the functional region may comprise a receptacle for an object. The functional region may be configured to present the second form upon detection of an object by a sensor. The functional region may be configured to return to a default form without detection of an object. The functional region may be configured to return to the default form after a threshold time. When an object providing a threshold force is detected by the sensor the functional region may present the second form and when the object is removed the functional region may present a default form. The object may comprise an electronic device and detection of the object may comprise detection of a signal from the electronic device. The signal may comprise detection of wireless charging capability for the electronic device. The functional region may comprise wireless charging capability. Upon detection of an electronic device with wireless charging capability the functional region may be configured (a) to present the second form with the receptacle for the electronic device and (b) to provide wireless charging for the electronic device. Illumination may be configured for a first pattern when the first form is presented and for a second pattern when the second form is presented. Illumination may be configured to present an indication of detection of the object. Illumination may be configured to present an indication of absence of the object. The control system may be configured to initiate the cycle for the functional region upon detection of the object. The control system may be configured to monitor the sensor. The base structure may comprise a compartment for the object. The functional region may comprise a base support for an object. The base support may comprise a platform. The platform may be configured for movement relative to the base structure between an elevated state and a lowered state. The platform may be in an elevated state for a default form. The platform may be in a lowered state for the second form. The platform may be configured to be presented at a first orientation and a second orientation. In the first orientation the platform may be generally horizontal. In the second orientation the platform may be generally tilted. The base structure may occupy a volume; the second form may comprise enlargement of the volume of the base structure. The component may comprise a cover. The functional region may comprise an opening in the cover. The functional region may comprise a gap in the cover. The functional region may comprise the cover. The functional region may be continuous with the cover. The component may comprise an actuator configured to operate a mechanism for the functional region. The mechanism may comprise a linkage. The actuator may comprise a motor. The actuator may comprise a pneumatic actuator. The mechanism may comprise a bladder. The component may comprise a control system. The control system may be configured to control the actuator. The control system may be configured to control the actuator at the direction of a sensor configured to detect an object. The control system may comprise a controller. The control system may be configured to provide a first illumination when the object is in a first state and a second illumination when the object is in a second state. The first state may comprise the object adjacent to a segment of the functional region. The second state may comprise the object at a segment of the functional region.

The present invention relates to a component for a vehicle interior comprising: a base structure comprising a functional region; the functional region may be configured to present a first form and a second form; the base structure may be configured to occupy a default volume in the vehicle interior; the second form may comprise an enlarged volume larger than the default volume. The second form may comprise a reduced volume smaller than the default volume. The first form may comprise the default volume. The first form may comprise a first shape and the second form may comprise a second shape. The first form may comprise a first shape for the base structure and the second form may comprise a second shape for the base structure. The functional region may comprise an adaptive volume mechanism. The first form may comprise a default form. The functional region may be in the default form when not in use. The component may comprise a cover. The functional region may comprise the cover. The functional region may be continuous with the cover. The first form may comprise reduction of volume from the default volume. The component may comprise an actuator configured to operate a mechanism for the functional region. The mechanism may comprise a linkage. The actuator may comprise a motor. The actuator may comprise a pneumatic actuator. The mechanism may comprise a bladder. The component may comprise a control system. The component may comprise at least one of (a) a console; (b) a floor console; (c) a tunnel console; (d) an armrest; (e) an instrument panel; (f) a door; (g) a door panel.

The present invention relates to a component for a vehicle interior comprising a base comprising an outer surface; and a support comprising an outer surface and configured to move between a raised position and a lowered position. The outer surface of the support and the outer surface of the base may comprise a substantially continuous surface when the support is in the raised position. The component may comprise a light source configured to provide a lighted border around the support. The support may be configured to descend into the base to provide a cavity. The component may comprise a light source configured to (a) provide a lighted border around the support when the support is in the raised position; (b) illuminate walls of the cavity. The component may comprise a mechanism configured to move the support between the raised position and the lowered position; the support and the base may provide a cavity when the support is in the lowered position. The support may comprise a switch configured to send a signal to the mechanism to move the support toward the lowered position in response to a force on the support. The mechanism may comprise a controller configured to hold the support in the lowered position for a duration of time after removal of the force on the support. The mechanism may comprise a controller configured to send a signal to the mechanism to move the support toward the raised position after a duration of time after removal of the force on the support. The support may comprise a top plate; a bottom plate; a spring.

The spring may be configured to separate the top plate and bottom plate; the spring may be configured to compress in response to the force on the support. The mechanism may comprise a limit switch configured to send a signal to the mechanism to stop movement of the support when the support is in the lowered position. The mechanism may comprise a scissor link. The mechanism may comprise a motor, a gear and an arm; the motor may be configured to rotate the gear; the gear may be configured to move the arm; the arm may be configured to at least one of (a) compress the scissor link; (b) extend the scissor link. The support may comprise a slot configured to guide movement of the scissor link. The base may comprise a slot configured to guide movement of the scissor link. The support may comprise a front portion and a rear portion; the front portion of the support may be configured to descend into the base by a first distance; the rear portion of the support may be configured to descend into the base by a second distance; the second distance may be greater than the first distance. The support may be configured to rotate relative to the base as the support descends into the base. The support may be configured to rotate and translate relative to the base as the support descends into the base. The support may be configured to (a) rotate relative to the base as the support descends into the base; (b) translate relative to the base as the support descends into the base. The support may comprise a sensor configured to sense an electronic device; the sensor may be configured to send a signal to the mechanism to move the support toward the lowered position when the sensor senses an electronic device. The sensor may comprise a wireless charging device. The mechanism may comprise a controller configured to hold the support in the lowered position for a duration of time after the sensor senses absence of the electronic device. The mechanism may comprise a controller configured to send a signal to the mechanism to move the support toward the raised position after a duration of time after the sensor senses absence of the electronic device. The support may comprise an arm coupled to the base at a joint; the joint may be spaced away from the outer surface of the support. The mechanism may comprise a motor and a link; the motor may be configured to rotate the link to move the outer surface of the support. The link may comprise a first link, a second link and a third link. The support may comprise a stop configured to stop movement of the support from the lowered position beyond the raised position. The component may comprise a cover; the cover may be configured to move with the support as the support moves between the raised position and the lowered position. The cover may be configured to extend as the support moves from the raised position toward the lowered position. The cover may be configured to contract as the support moves from the lowered position toward the raised position. The cover may comprise a decorative layer and a support layer. The mechanism may comprise at least one air bladder. The at least one air bladder may be configured to at least one of (a) expand to move the support; (b) contract to move the support. The at least one air bladder may comprise a first air bladder and a second air bladder. The first air bladder may be configured to contract to move the support from the raised position to the lowered position. The second air bladder may be configured to expand to move the support from the raised position to the lowered position. The at least one air bladder may comprise a first upper air bladder, a second upper air bladder, a first lower air bladder and a second lower air bladder. The first upper air bladder and the second upper air bladder may be configured to contract to move the support from the raised position to the lowered position. The first lower air bladder and the second lower air bladder may be configured to expand to move the support from the raised position to the lowered position. The first upper air bladder may be configured to contract and the second lower air bladder may be configured to expand to rotate the support relative to the base as the support descends into the base. The component may comprise at least one of (a) a console; (b) a floor console; (c) a tunnel console; (d) an armrest; (e) an instrument panel; (f) a door; (g) a door panel.

The present invention relates to a component for a vehicle interior comprising a base comprising an outer surface; and a support comprising an outer surface and configured to move between a raised position and a lowered position. The outer surface of the support and the outer surface of the base may comprise a substantially continuous surface when the support is in the lowered position. The outer surface of the support and the outer surface of the base may comprise a substantially planar surface when the support is in the lowered position. The component may comprise a cover; the cover may be configured to move with the support as the support moves between the raised position and the lowered position. The cover may be configured to extend as the support moves from the lowered position toward the raised position. The cover may be configured to contract as the support moves from the raised position toward the lowered position. The cover may comprise a decorative layer and a support layer. The cover may comprise at least one of (a) an elastomer; (b) an olefin: (c) a thermoplastic material; (d) a synthetic rubber; (e) neoprene; (f) a thermoplastic olefin; (g) a thermoplastic elastomer. The cover may be configured to provide a force to move the support from the raised position toward the lowered position. The component may comprise a mechanism configured to move the support between the raised position and the lowered position; the support may be configured to protrude from the base when the support is in the raised position. The mechanism may comprise at least one air bladder. The at least one air bladder may be configured to at least one of (a) expand to move the support; (b) contract to move the support. The at least one air bladder may comprise a first air bladder and a second air bladder. The first air bladder may be configured to expand to move the support from the lowered position to the raised position. The second air bladder may be configured to contract to move the support from the raised position toward the lowered position. The at least one air bladder may comprise a first upper air bladder, a second upper air bladder, a first lower air bladder and a second lower air bladder. The first upper air bladder and the second upper air bladder may be configured to expand to move the support from the lowered position to the raised position. The first lower air bladder and the second lower air bladder may be configured to contract to move the support from the lowered position to the raised position. The second upper air bladder may be configured to expand and the second lower air bladder may be configured to contract to rotate the support relative to the base as the support moves from the lowered position toward the raised position. The mechanism may comprise at least one pneumatic actuator. The mechanism may comprise at least one pump and at least one valve. The support may comprise a first support configured to move between a lowered position and a raised position and a second support configured to move between a lowered position and a raised position; the first support may comprise an outer surface and the second support may comprise an outer surface; the outer surface of the first support, the outer surface of the second support and the outer surface of the base may comprise a substantially continuous surface when the first support is in the lowered position of the first support and the second support is in the lowered position of the second support. The first support may be configured to move between the lowered position of the first support and the raised position of the first support when the second support is in the lowered position of the second support or the raised position of the second support. The first support may be configured to translate relative to the base as the first support moves between the lowered position of the first support and the raised position of the first support. The second support may be configured to rotate relative to the base as the second support moves between the lowered position of the second support and the raised position of the second support. The component may comprise a first mechanism configured to move the first support and a second mechanism configured to move the second support. The component may comprise a pump and a valve; the pump and the valve may be configured to actuate (a) the first mechanism; (b) the second mechanism. The component may comprise a cover; the first support may be configured to cover the cover; the cover may be configured to cover the second support. The component may comprise a cover; the cover may be configured to extend as (a) the first support moves from the lowered position of the first support toward the raised position of the first support; (b) the second support moves from the lowered position of the second support toward the raised position of the second support. The component may comprise at least one of (a) a console; (b) a floor console; (c) a tunnel console; (d) an armrest; (e) an instrument panel; (f) a door; (g) a door panel.

FIGURES

FIGS. 5A and 5B are schematic exploded partial perspective views of a vehicle interior component according to an exemplary embodiment.

FIG. 5C is a schematic exploded partial perspective view of a vehicle interior component according to an exemplary embodiment.

FIG. 8A is a schematic exploded partial perspective view of a vehicle interior component according to an exemplary embodiment.

FIG. 8B is a schematic exploded partial perspective view of a vehicle interior component according to an exemplary embodiment.

FIG. 11A is a schematic exploded partial perspective view of a vehicle interior component according to an exemplary embodiment.

FIGS. 11B and 11C are schematic partial perspective views of a vehicle interior component according to an exemplary embodiment.

FIG. 15A is a schematic exploded perspective view of a vehicle interior component according to an exemplary embodiment.

FIG. 15B is a schematic exploded partial perspective view of a vehicle interior component according to an exemplary embodiment.

FIGS. 17A through 17C are schematic partial perspective views of a vehicle interior component according to an exemplary embodiment.

DESCRIPTION

Figure 1A:
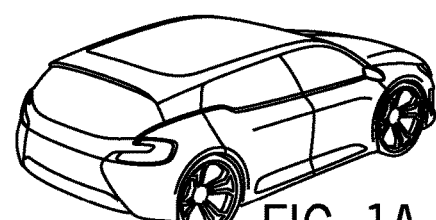
FIG. 1A is a schematic perspective view of a vehicle according to an exemplary embodiment.
Figure 1B:
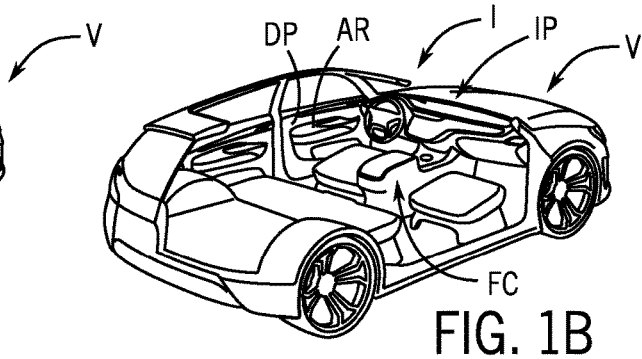
FIG. 1B is a schematic perspective view of a vehicle showing a vehicle interior according to an exemplary embodiment.

According to an exemplary embodiment as shown schematically in FIGS. 1A to 1B, a vehicle V may include a vehicle interior I. The vehicle interior may provide components C such as panels, consoles, compartments, etc.

Referring to FIGS. 1A-1B a vehicle V is shown as providing an interior I comprising components shown as instrument panel IP, console shown a floor console FC, door panel DP and armrest AR. See also FIGS. 1C-1H. As indicated schematically according to an exemplary embodiment in FIGS. 1B-1H, the components (e.g. console, panel, etc.) may be configured to provide a base/structure and cover with an exterior surface for the vehicle interior. As indicated schematically in FIGS. 1B-1H, a component for the vehicle interior may comprise a functional region FR; as indicated schematically, the functional region FR may be integrated with a console shown as floor console FC (see FIGS. 1C-1E and 1G) and/or integrated with an instrument panel (see FIGS. 1B and 1F) and/or provided for an armrest AR such for a panel shown as door panel DP (see FIG. 1H).

Figure 1C:
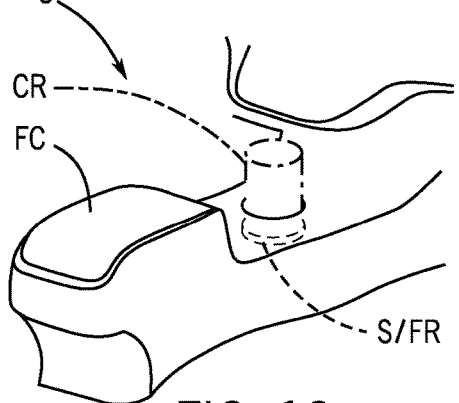
FIGS. 1C through 1H are schematic perspective views of vehicle interior components according to an exemplary embodiment.
Figure 1D:
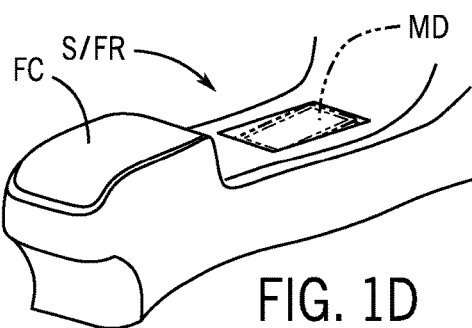
Figure 1E:
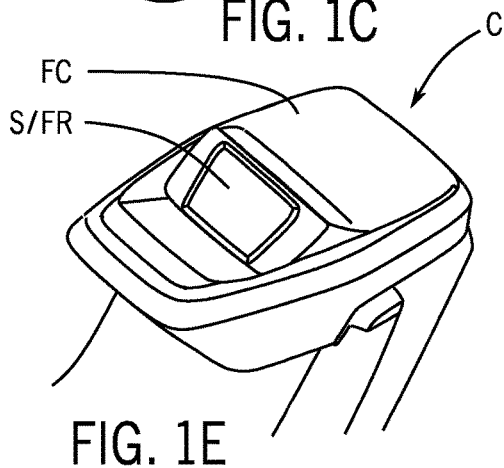
Figure 1F:
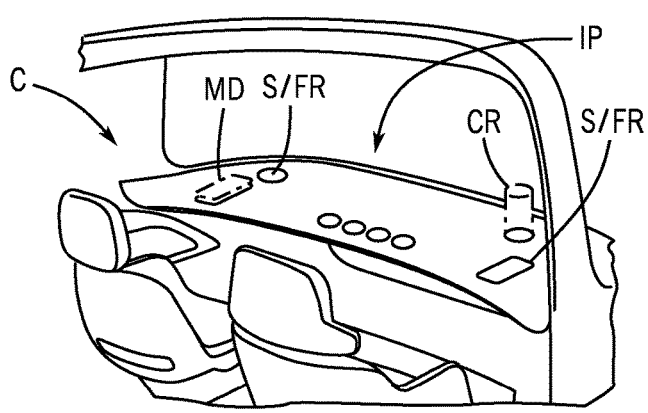

Referring to FIGS. 1C and 1F, the functional region FR of the component shown as a floor console FC may comprise a support S movable relative to a base/structure and configured to provide a receptacle for an object shown as container/cup CR; as indicated schematically, the support S/FR may be configured to move from a raised position (e.g. substantially continuous with the surface of the base/structure) to a lowered position to provide the receptacle for the object. See also FIGS. 2A-2C and 3A-3F.

Referring to FIGS. 1D-1E and 1F, the functional region FR of the component shown as a floor console FC may comprise a support S movable relative to a base/structure configured to provide a receptacle for an object such as a mobile/electronic device shown as a mobile phone MD; as indicated schematically, the support S/FR may be configured to move from a raised position to a lowered position and/or to move in orientation (e.g., raise, lower, tilt, level, etc. relative to the surface of the base/structure) to provide a platform and/or receptacle for an object. See also FIGS. 2D-2L, 4A-4F, 7A-7F, 9A-9F and 17A-17C.

Figure 1G:
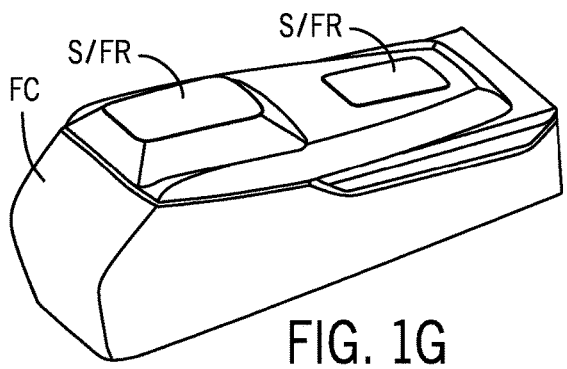
Figure 1H:
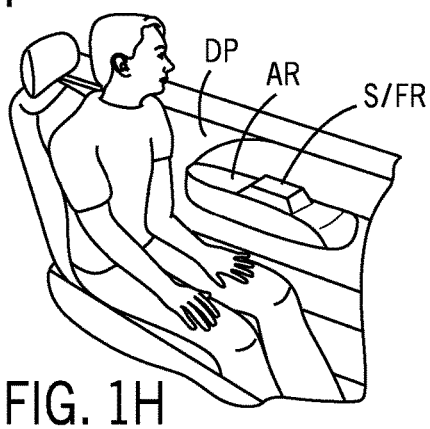
Figure 2A:
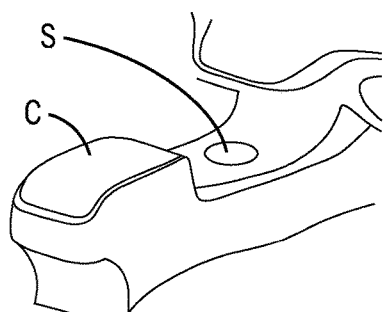
FIGS. 2A through 2V are schematic perspective views of vehicle interior components according to an exemplary embodiment.
Figure 2B:
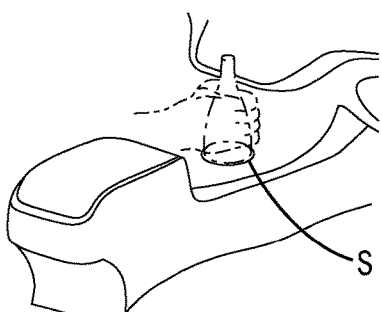
Figure 2C:
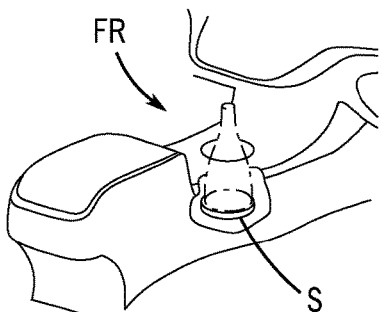
Figure 2D:
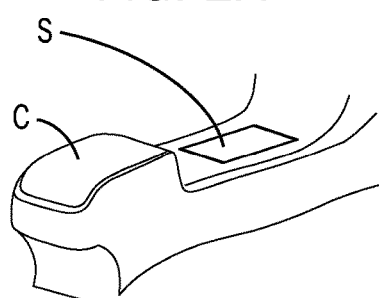
Figure 2E:
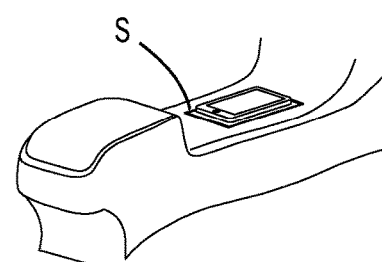
Figure 2F:
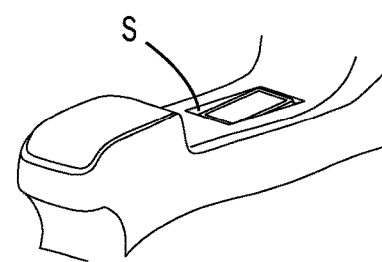
Figure 2G:
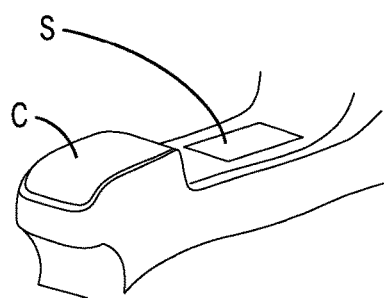
Figure 2H:
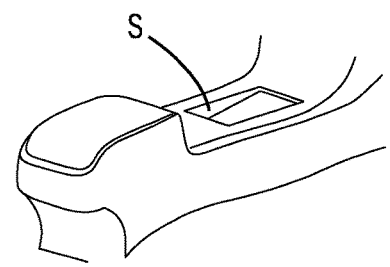
Figure 2I:
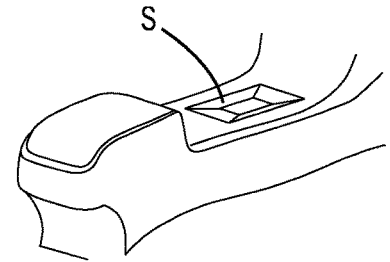
Figure 2J:
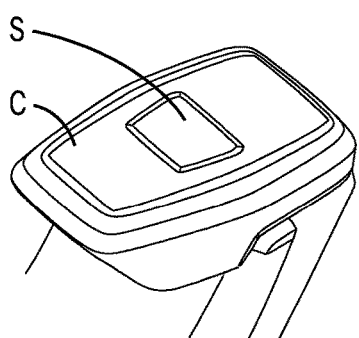
Figure 2K:
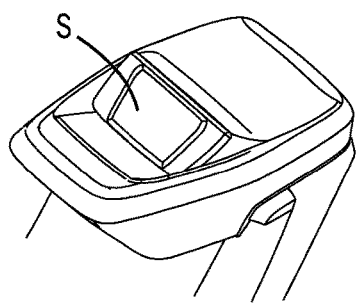
Figure 2L:
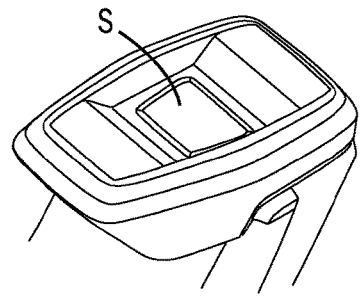
Figure 2M:
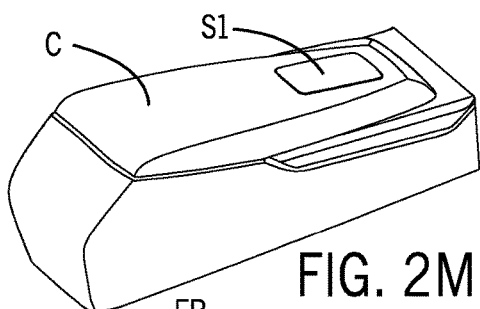
Figure 2N:
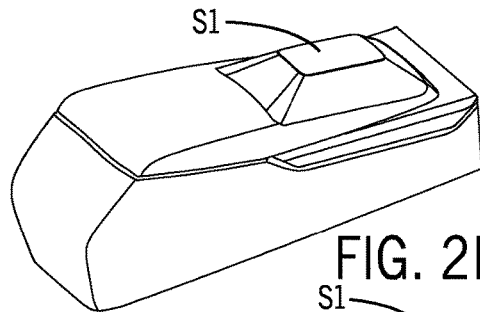
Figure 2O:
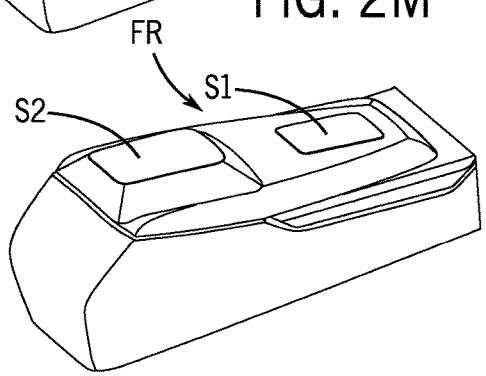
Figure 2P:
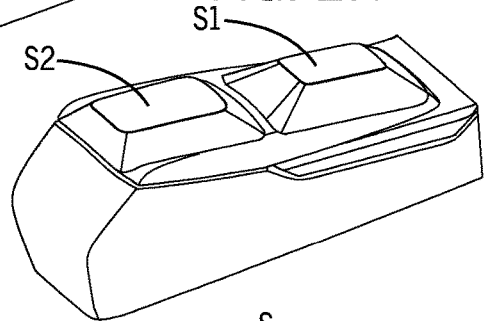
Figure 2Q:
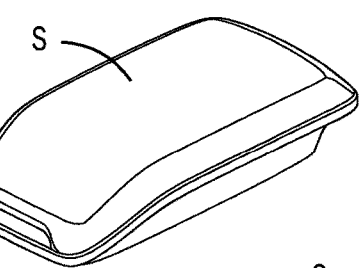
Figure 2R:
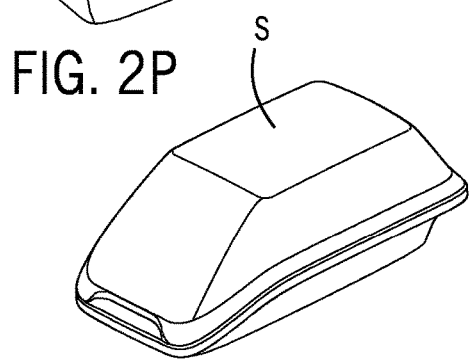
Figure 2S:
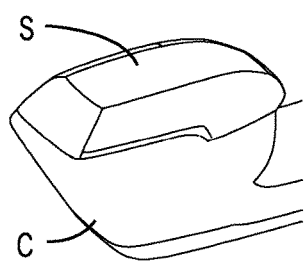
Figure 2T:
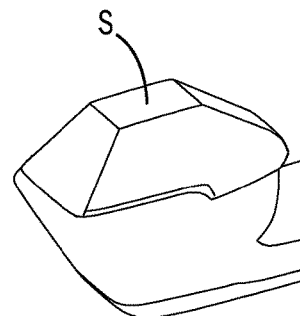
Figure 2U:
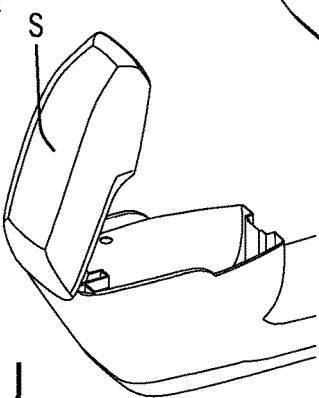
Figure 2V:
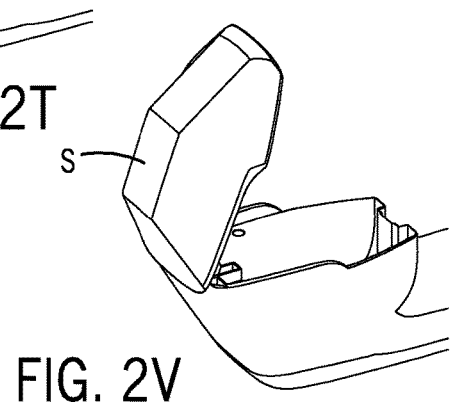

Referring to FIGS. 1G and 1H, the functional region of the component shown as a console (FIG. 1G) or armrest AR for door panel DP (FIG. 1H) may comprise a support S configured to provide an adaptable volume for a base/structure; as indicated schematically, the support S/FR of the base/structure may be configured to occupy a default volume and actuated to occupy an enlarged volume and/or retracted volume (e.g. raised position and/or lowered position, etc.). See also FIGS. 2M-2V, 10A-10H, 14A-14D, 16A-16D, 17A-17C, 19A-19F, 20A-20B and 22A-22D.

Figure 3A:
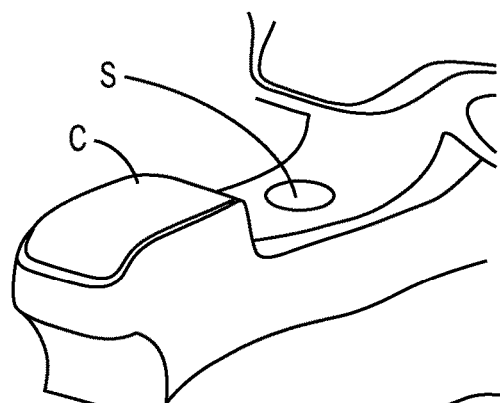
FIGS. 3A through 3F are schematic perspective views of a vehicle interior component shown as a console assembly according to an exemplary embodiment.
Figure 3B:
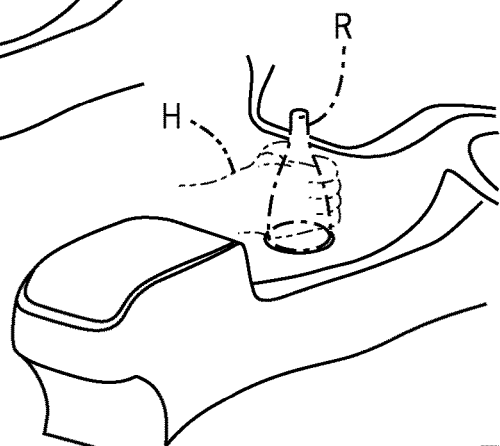
Figure 3C:
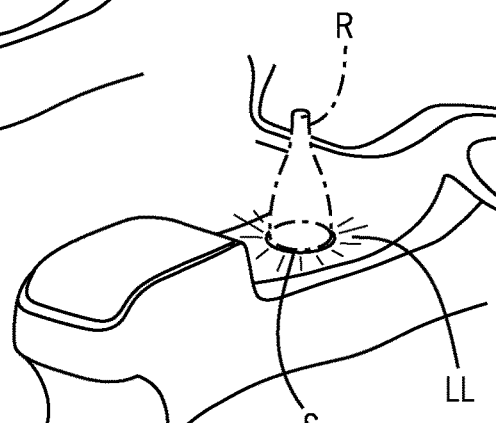
Figure 3D:
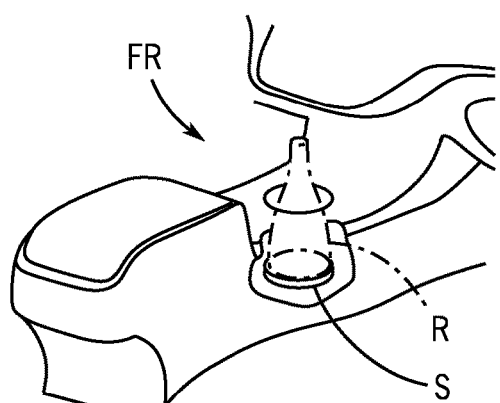
Figure 3E:
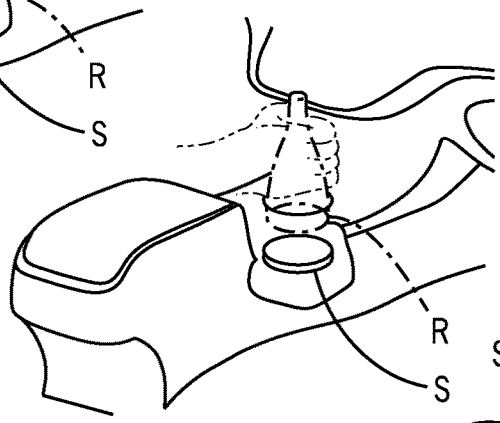
Figure 3F:
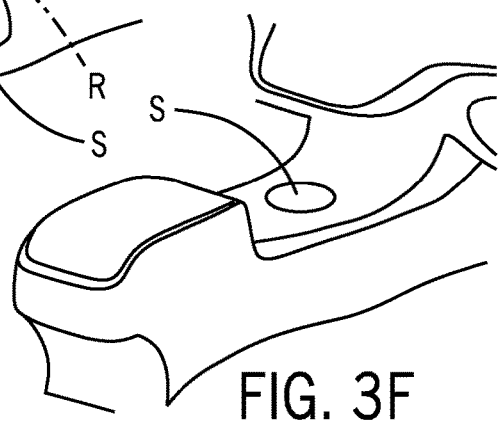
Figure 3H:
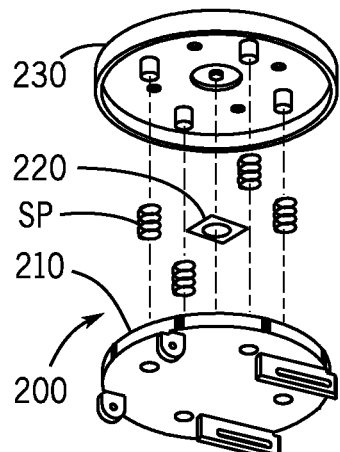
FIGS. 3G through 3I are schematic exploded partial perspective views of a vehicle interior component according to an exemplary embodiment.
Figure 3G:
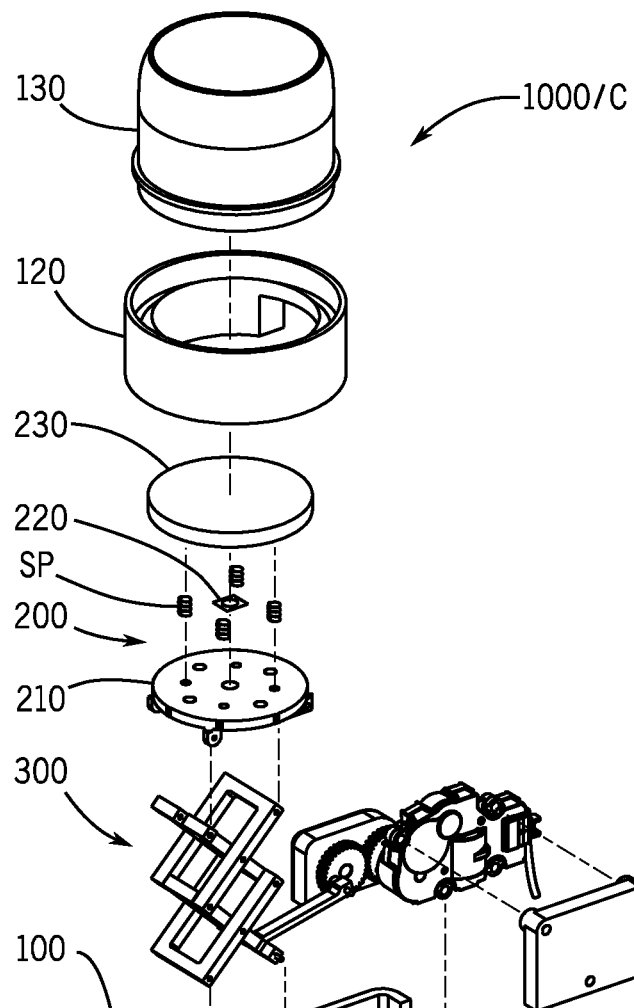
Figure 3I:
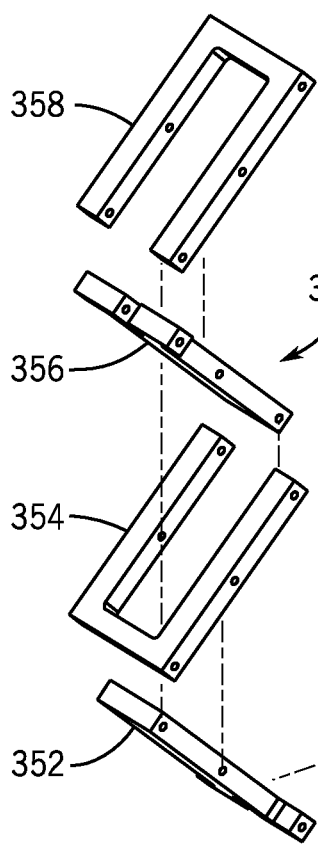
Figure 3J:
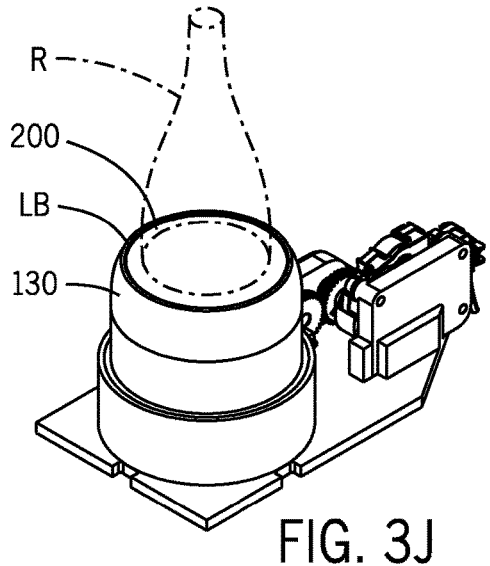
FIGS. 3J and 3K are schematic partial perspective views of a vehicle interior component according to an exemplary embodiment.
Figure 3M:
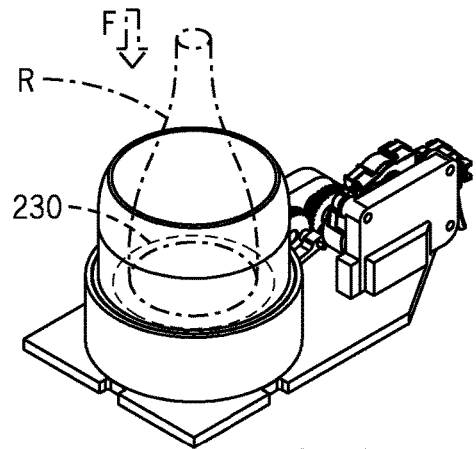
FIGS. 3M and 3N are schematic partial perspective views of a vehicle interior component according to an exemplary embodiment.
Figure 3K:
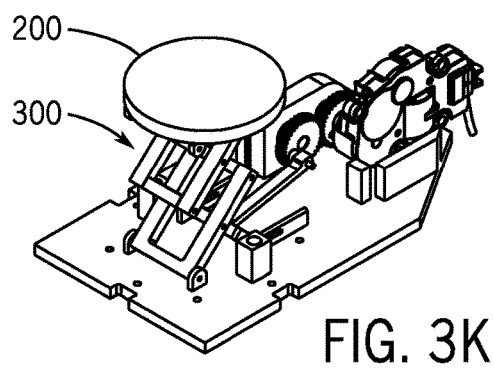
Figure 3N:
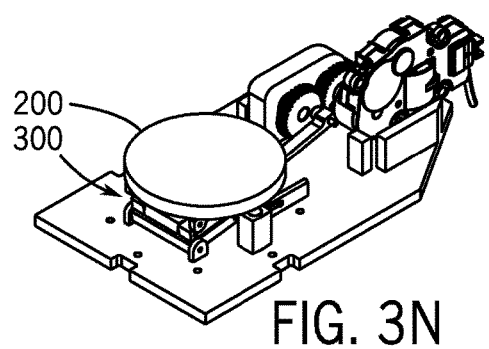
Figure 3L:
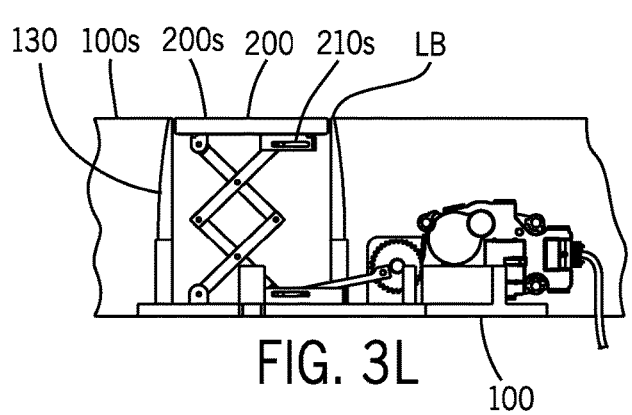
FIG. 3L is a schematic partial side view of a vehicle interior component according to an exemplary embodiment.
Figure 3O:
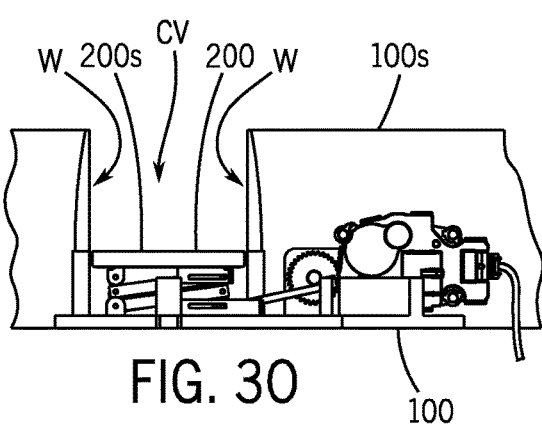
FIG. 3O is a schematic partial side view of a vehicle interior component according to an exemplary embodiment.

According to an exemplary embodiment as shown schematically in FIGS. 3A-3O, a component C/1000 for a vehicle interior may comprise a base 100 comprising an outer surface 100s and a support 200 comprising an outer surface S/200s and configured to move between a raised position as shown schematically in FIGS. 3A-3C, 3F and 3J-3L and a lowered position as shown schematically in FIGS. 3D, 3E and 3M-3O. Outer surface 200s of support 200 and outer surface 100s of base 100 may comprise a substantially continuous surface when support 200 is in the raised position. Component 1000 may comprise a light source 120 configured to provide a lighted border LB around support 200. (See FIGS. 3C and 3L.) Support 200 may be configured to descend into base 100 to provide a cavity CV. (See FIG. 3O.) Component 1000 may comprise a light source 120 configured to (a) provide a lighted border LB around support 200 when support 200 is in the raised position; (b) illuminate walls W of the cavity CV. Component 1000 may comprise a mechanism 300 configured to move support 200 between the raised position and the lowered position; support 200 and base 100 may provide cavity CV when support 200 is in the lowered position. Support 200 may comprise a switch 220 configured to send a signal to mechanism 300 to move support 200 toward the lowered position in response to a force F on support 200. Mechanism 300 may comprise a controller 315 configured to hold support 200 in the lowered position for a duration of time after removal of the force on support 200. Mechanism 300 may comprise a controller 315 configured to send a signal to mechanism 300 to move support 200 toward the raised position after a duration of time after removal of the force on support 200. Support 200 may comprise a top plate 230; a bottom plate 210; a spring SP. Spring SP may be configured to separate top plate 230 and bottom plate 210; spring SP may be configured to compress in response to the force on support 200. Mechanism 300 may comprise a limit switch 110 configured to send a signal to mechanism 300 to stop movement of support 200 when support 200 is in the lowered position. Mechanism 300 may comprise a scissor link 350. Mechanism 300 may comprise a motor 310, a gear 320 and an arm 330; motor 310 may be configured to rotate gear 320; gear 320 may be configured to move arm 330; arm 330 may be configured to at least one of (a) compress scissor link 350; (b) extend scissor link 350. Support 200 may comprise a slot 210s configured to guide movement of scissor link 350. Base 100 may comprise a slot 100s configured to guide movement of scissor link 350. Component 1000 may comprise at least one of (a) a console; (b) a floor console; (c) a tunnel console; (d) an armrest; (e) an instrument panel; (f) a door; (g) a door panel. Component 1000 may comprise an enclosure 130 configured to provide walls W of cavity CV. Mechanism 300 may comprise a support 340 for motor 310 and/or gear 320. Scissor link 350 may comprise at least one of (a) a first link 352; (b) a second link 354; (c) a third link 356; (d) a fourth link 358. As shown schematically in FIGS. 3B-3D, support 200 may be configured to descend into base 100 in response to placement of a receptacle R on outer surface S of support 200. As shown schematically in FIGS. 3E-3F, support 200 may be configured to rise in response to removal of receptacle R from outer surface S of support 200.

According to an exemplary embodiment as shown schematically in FIGS. 4A-4F, 5A-5C and 6A-6F, a component C/2000 for a vehicle interior may comprise a base 2100 comprising an outer surface 2100s and a support 2200 comprising an outer surface S/2200s and configured to move between a raised position as shown schematically in FIGS. 4A-4C, 4F and 6A-6C and a lowered position as shown schematically in FIGS. 4D, 4E and 6D-6F. Outer surface 2200s of support 2200 and outer surface 2100s of base 2100 may comprise a substantially continuous surface when support 2200 is in the raised position. Component 2000 may comprise a light source 2120 configured to provide a lighted border LB around support 2200. Support 2200 may be configured to descend into base 2100 to provide a cavity CV. Component 2000 may comprise a light source 2120 configured to (a) provide a lighted border LB around support 2200 when support 2200 is in the raised position; (b) illuminate walls W of cavity CV. Component 2000 may comprise a mechanism 2300 configured to move support 2200 between the raised position and the lowered position; support 2200 and base 2100 may provide a cavity CV when support 2200 is in the lowered position. Mechanism 2300 may comprise a limit switch 2312 configured to send a signal to mechanism 2300 to stop movement of support 2200 when support 2200 is in the lowered position. Support 2200 may comprise a front portion 2200f and a rear portion 2200r; front portion 2200f of support 2200 may be configured to descend into base 2100 by a first distance D1; rear portion 2200r of support 2200 may be configured to descend into base 2100 by a second distance D2; second distance D2 may be greater than first distance D1. (See FIG. 6F.) Support 2200 may be configured to rotate relative to base 2100 as support 2200 descends into base 2100. Support 2200 may be configured to rotate and translate relative to base 2100 as support 2200 descends into base 2100. Support 2200 may be configured to (a) rotate relative to base 2100 as support 2200 descends into base 2100; (b) translate relative to base 2100 as support 2200 descends into base 2100. Support 2200 may comprise a sensor 2220 configured to sense an electronic device; sensor 2220 may be configured to send a signal to mechanism 2300 to move support 2200 toward the lowered position when sensor 2200 senses an electronic device. Sensor 2220 may comprise a wireless charging device. Mechanism 2300 may comprise a controller 2315 configured to hold support 2200 in the lowered position for a duration of time after sensor 2220 senses absence of the electronic device. Mechanism 2300 may comprise a controller 2315 configured to send a signal to mechanism 2300 to move support 2200 toward the raised position after a duration of time after sensor 2220 senses absence of the electronic device. Support 2200 may comprise an arm 2358a coupled to base 2100 at a joint or pivot P1; joint or pivot P1 may be spaced away from outer surface 2200s of support 2200. Mechanism 2300 may comprise a motor 2310 and a link 2350; motor 2310 may be configured to rotate link 2350 to move outer surface 2200s of support 2200. Link 2350 may comprise a first link 2352, a second link 2354 and a third link 2356. Support 2200 may comprise a stop 2358s configured to stop movement of support 2200 from the lowered position beyond the raised position. Component 2000 may comprise at least one of (a) a console; (b) a floor console; (c) a tunnel console; (d) an armrest; (e) an instrument panel; (f) a door; (g) a door panel. Base 2100 may comprise at least one of (a) an enclosure 2130; (b) a lower portion 2110. Mechanism 2300 may comprise at least one of (a) a pin or set of pins 2350p; (b) an end cap or a set of end caps 2360. Mechanism 2300 may comprise at least one of (a) a set of pivots P1, P2, P3 and P4; (b) a first pivot P1; (c) a second pivot P2; (d) a third pivot P3; (e) a fourth pivot P4. As shown schematically in FIGS. 4A-4D, support 2200 may be configured to descend into base 2100 in response to placement of a mobile device MD by a hand H on outer surface S of support 2200. As shown schematically in FIGS. 4E-4F, support 2200 may be configured to rise in response to removal of mobile device MD from outer surface S of support 2200.

According to an exemplary embodiment as shown schematically in FIGS. 7A-7F, 8A-8B and 9A-9F, a component C/3000 for a vehicle interior may comprise a base 3100 comprising an outer surface 3100s and a support 3200 comprising an outer surface 3200s and configured to move between a raised position as shown schematically in FIGS. 7A, 7D, 9A and 9B and a lowered position as shown schematically in FIGS. 7B, 7C, 7E, 7F and 9C-9F. Outer surface 3200s of support 3200 and outer surface 3100s of base 3100 may comprise a substantially continuous surface when support 3200 is in the raised position. Support 3200 may be configured to descend into base 3100 to provide a cavity CV. Component 3000 may comprise a mechanism 3300 configured to move support 3200 between the raised position and the lowered position; support 3200 and base 3100 may provide a cavity CV when support 3200 is in the lowered position. Support 3200 may comprise a front portion 3200f and a rear portion 3200r; front portion 3200f of support 3200 may be configured to descend into base 3100 by a first distance D1; rear portion 3200r of support 3200 may be configured to descend into base 3100 by a second distance D2; second distance D2 may be greater than first distance D1. (See FIG. 9D.) Support 3200 may be configured to rotate relative to base 3100 as support 3200 descends into base 3100. Support 3200 may be configured to rotate and translate relative to base 3100 as support 3200 descends into base 3100. Support 3200 may be configured to (a) rotate relative to base 3100 as support 3200 descends into base 3100 as shown schematically in FIGS. 7B, 7E, 9C and 9D; (b) translate relative to base 3100 as support 3200 descends into base 3100 as shown schematically in FIGS. 7C, 7F, 9E and 9F. Component 3000 may comprise a cover 3500/3600; cover 3500/3600 may be configured to move with support 3200 as support 3200 moves between the raised position and the lowered position as shown schematically in FIGS. 9C-9F. Cover 3500/3600 may be configured to extend as support 3200 moves from the raised position toward the lowered position. Cover 3500/3600 may be configured to contract as support 3200 moves from the lowered position toward the raised position. Cover 3500/3600 may comprise a decorative layer 3600 and a support layer 3500. Mechanism 3300 may comprise at least one air bladder. The at least one air bladder may be configured to at least one of (a) expand to move support 3200; (b) contract to move support 3200. The at least one air bladder may comprise a first air bladder 3301 and a second air bladder 3302. First air bladder 3301 may be configured to contract to move support 3200 from the raised position to the lowered position. Second air bladder 3302 may be configured to expand to move support 3200 from the raised position to the lowered position. The at least one air bladder may comprise a first upper air bladder 3301*a*, a second upper air bladder 3301*b*, a first lower air bladder 3302*a* and a second lower air bladder 3302*b*. First upper air bladder 3301*a* and second upper air bladder 3301*b* may be configured to contract to move support 3200 from the raised position to the lowered position. First lower air bladder 3302*a* and second lower air bladder 3302*b* may be configured to expand to move support 3200 from the raised position to the lowered position. First upper air bladder 3301*a* may be configured to contract and second lower air bladder 3302*b* may be configured to expand to rotate support 3200 relative to base 3100 as support 3200 descends into base 3100. Component 3000 may comprise at least one of (a) a console; (b) a floor console; (c) a tunnel console; (d) an armrest; (e) an instrument panel; (f) a door; (g) a door panel. Component 3000 may comprise at least one of (a) a ring 3110; (b) a plate 3120. Mechanism may comprise a pump 3310. Support layer 3500 may comprise at least one of (a) an elastomer; (b) an olefin: (c) a thermoplastic material; (d) a synthetic rubber; (e) neoprene; (f) a thermoplastic olefin; (g) a thermoplastic elastomer.

According to an exemplary embodiment as shown schematically in FIGS. 10A-10H, 11A-11C, 12A-12F and 13A-13F, a component 4000 for a vehicle interior may comprise a base 4100 comprising an outer surface 4100*s* and a support 4200*a*/4200*b* comprising an outer surface and configured to move between a raised position as shown schematically in FIGS. 10B-10D, 10F-10H, 12D-12F and 13D-13F and a lowered position as shown schematically in FIGS. 10A, 10E, 12A-12C and 13A-13C. The outer surface of support 4200*a*/4200*b* and outer surface 4100*s* of base 4100 may comprise a substantially continuous surface when support 4200*a*/4200*b* is in the lowered position. The outer surface of support 4200*a*/4200*b* and outer surface 4100*s* of base 4100 may comprise a substantially planar surface when support 4200*a*/4200*b* is in the lowered position. Component 4000 may comprise a cover 4150; cover 4150 may be configured to move with support 4200*a*/4200*b* as support 4200*a*/4200*b* moves between the raised position and the lowered position. Cover 4150 may be configured to extend as support 4200*a*/4200*b* moves from the lowered position toward the raised position. Cover 4150 may be configured to contract as support 4200*a*/4200*b* moves from the raised position toward the lowered position. Cover 4150 may comprise a decorative layer and a support layer. Cover 4150 may comprise at least one of (a) an elastomer; (b) an olefin: (c) a thermoplastic material; (d) a synthetic rubber; (e) neoprene; (f) a thermoplastic olefin; (g) a thermoplastic elastomer. Cover 4150 may be configured to provide a force to move support 4200*a*/4200*b* from the raised position toward the lowered position. Component 4000 may comprise a mechanism 4300*a*/4300*b* configured to move support 4200*a*/4200*b* between the raised position and the lowered position; support 4200*a*/4200*b* may be configured to protrude from base 4100 when support 4200*a*/4200*b* is in the raised position. Mechanism 4300*a*/4300*b* may comprise at least one air bladder. The at least one air bladder may be configured to at least one of (a) expand to move support 4200*a*/4200*b*; (b) contract to move support 4200*a*/4200*b*. The at least one air bladder may comprise a first air bladder and a second air bladder. The at least one air bladder may comprise a set of air bladders 4301*b*. The first air bladder may be configured to expand to move support 4200*b* from the lowered position to the raised position. The second air bladder may be configured to contract to move support 4200*b* from the raised position toward the lowered position. The at least one air bladder may comprise a first upper air bladder, a second upper air bladder, a first lower air bladder and a second lower air bladder. The first upper air bladder and the second upper air bladder may be configured to expand to move support 4200*b* from the lowered position to the raised position. The first lower air bladder and the second lower air bladder may be configured to contract to move support 4200*b* from the lowered position to the raised position. The second upper air bladder may be configured to expand and the second lower air bladder may be configured to contract to rotate support 4200*b* relative to base 4100 as support 4200*b* moves from the lowered position toward the raised position. Mechanism 4300*a*/4300*b* may comprise at least one pneumatic actuator. Mechanism 4300*a*/4300*b* may comprise at least one pump 3310 and at least one valve 4312. Support 4200*b* may be configured to rotate relative to base 4100 as support 4200*b* moves from the lowered position toward the raised position. Support 4200*b* may be configured to rotate and translate relative to base 4100 as support 4200*b* moves from the lowered position toward the raised position. Support 4200*b* may comprise a front portion and a rear portion; when support 4200*b* is in the raised position the front portion of support 4200*b* may be configured to protrude from base 4100 by a first distance and the rear portion of support 4200*b* may be configured to protrude from base 4100 by a second distance; the second distance may be greater than the first distance. Support 4200*a*/4200*b* may comprise a first support 4200*a* configured to move between a lowered position and a raised position and a second support 4200*b* configured to move between a lowered position and a raised position; first support 4200*a* may comprise an outer surface and second support 4200*b* may comprise an outer surface; the outer surface of first support 4200*a*, the outer surface of second support 4200*b* and outer surface 4100*s* of base 4100 may comprise a substantially continuous surface when first support 4200*a* is in the lowered position of first support 4200*a* and second support 4200*b* is in the lowered position of second support 4200*b*. First support 4200*a* may be configured to move between the lowered position of first support 4200*a* and the raised position of first support 4200*a* when second support 4200*b* is in the lowered position of second support 4200*b* or the raised position of second support 4200*b*. First support 4200*a* may be configured to translate relative to base 4100 as first support 4200*a* moves between the lowered position of first support 4200*a* and the raised position of first support 4200*a*. Second support 4200*b* may be configured to rotate relative to base 4100 as second support 4200*b* moves between the lowered position of second support 4200*b* and the raised position of second support 4200*b*. Component 4000 may comprise a first mechanism 4300*a* configured to move first support 4200*a* and a second mechanism 4300*b* configured to move second support 4200*b*. Component 4000 may comprise a pump 3310 and a valve 4312; pump 3310 and valve 4312 may be configured to actuate (a) first mechanism 4300*a*; (b) second mechanism 4300*b*. Component 4000 may comprise a cover 4150; first support 4200*a* may be configured to cover cover 4150; cover 4150 may be configured to cover second support 4200*b*. Cover 4150 may be configured to extend as (a) first support 4200*a* moves from the lowered position of first support 4200*a* toward the raised position of first support 4200*a*; (b) second support 4200*b* moves from the lowered position of second support 4200*b* toward the raised position of second support 4200*b*. Component 4000 may comprise at least one of (a) a console; (b) a floor console; (c) a tunnel console; (d) an armrest; (e) an instrument panel; (f) a door; (g) a door panel.

According to an exemplary embodiment as shown schematically in FIGS. 14A-14D, 15A, 15B and 16A-16D, a component C/5000 for a vehicle interior may comprise a base 5100 comprising an outer surface 5102*s* and a support 5200 comprising an outer surface 5200*s* and configured to move between a raised position as shown schematically in FIGS. 14B, 14D and 16C-16D and a lowered position as shown schematically in FIGS. 14A, 14C and 16A-16B. Outer surface 5200*s* of support 5200 and outer surface 5102*s* of base 5100 may comprise a substantially continuous surface when support 5200 is in the lowered position. Outer surface 5200*s* of support 5200 and outer surface 5102*s* of base 5100 may comprise a substantially planar surface when support 5200 is in the lowered position. Component 5000 may comprise a cover 5500/5600; cover 5500/5600 may be configured to move with support 5200 as support 5200 moves between the raised position and the lowered position. Cover 5500/5600 may be configured to extend as support 5200 moves from the lowered position toward the raised position. Cover 5500/5600 may be configured to contract as support 5200 moves from the raised position toward the lowered position. Cover 5500/5600 may comprise a decorative layer 5600 and a support layer 5500. Support layer 5500 may comprise at least one of (a) an elastomer; (b) an olefin: (c) a thermoplastic material; (d) a synthetic rubber; (e) neoprene; (f) a thermoplastic olefin; (g) a thermoplastic elastomer. Cover 5500/5600 may be configured to provide a force to move support 5200 from the raised position toward the lowered position. Component 5000 may comprise a mechanism 5300 configured to move support 5200 between the raised position and the lowered position; support 5200 may be configured to protrude from base 5100 when support 5200 is in the raised position. Mechanism 5300 may comprise at least one air bladder. The at least one air bladder may be configured to at least one of (a) expand to move support 5200; (b) contract to move support 5200. The at least one air bladder may comprise a first air bladder 5300*a* and a second air bladder 5300*b*. The at least one air bladder may be configured to expand to move support 5200 from the lowered position to the raised position. The at least one air bladder may be configured to contract to move support 5200 from the raised position toward the lowered position. Mechanism 5300 may comprise at least one pneumatic actuator. Mechanism 5300 may comprise at least one pump 5310 and at least one valve 5312. Support 5200 may be configured to rotate relative to base 5100 as support 5200 moves from the lowered position toward the raised position. One of first air bladder 5300*a* and second air bladder 5300*b* may be configured to expand to rotate support 5200 relative to base 5100. Support 5200 may be configured to rotate and translate relative to base 5100 as support 5200 moves from the lowered position toward the raised position. One of first air bladder 5300*a* and second air bladder 5300*b* may be configured to expand a first amount and the other of first air bladder 5300*a* and second air bladder 5300*b* may be configured to expand a second amount greater than the first amount to rotate and translate support 5200 relative to base 5100. Support 5200 may comprise a front portion and a rear portion; when support 5200 is in the raised position the front portion of support 5200 may be configured to protrude from base 5100 by a first distance and the rear portion of support 5200 may be configured to protrude from base 5100 by a second distance; the second distance may be greater than the first distance. Component 5000 may comprise at least one of (a) a console; (b) a floor console; (c) a tunnel console; (d) an armrest; (e) an instrument panel; (f) a door; (g) a door panel.

Figure 19A:
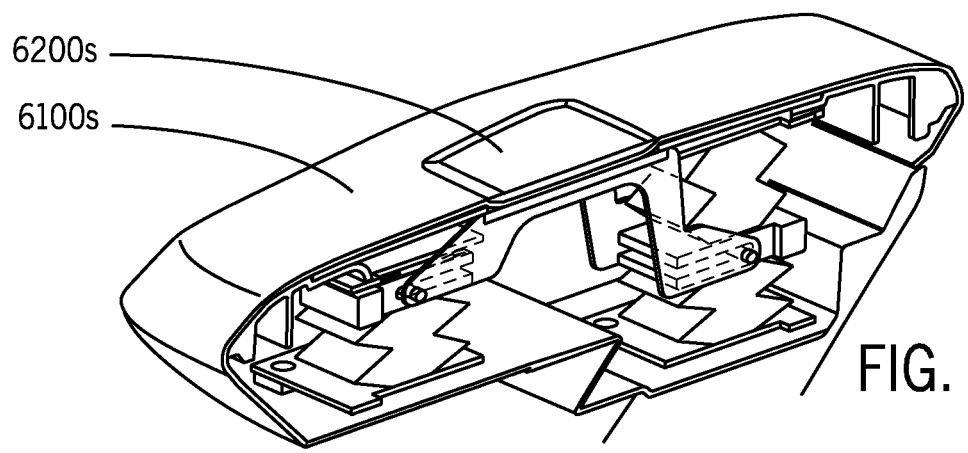
FIGS. 19A, 19C and 19E are schematic partial perspective views of a vehicle interior component according to an exemplary embodiment.
Figure 19B:
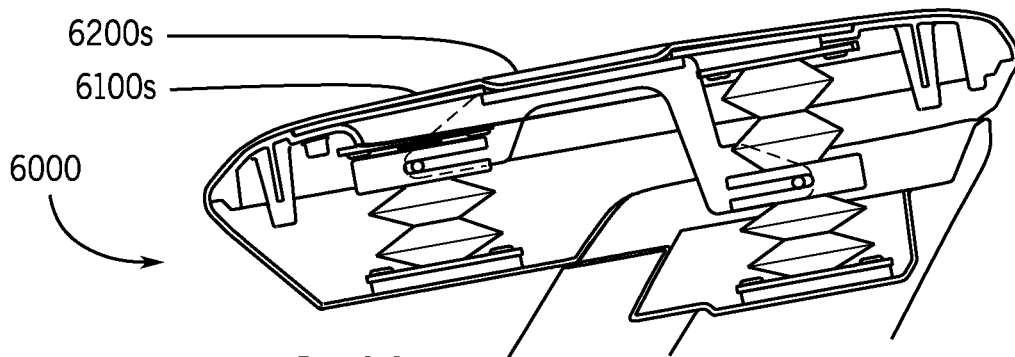
FIGS. 19B, 19D and 19F are schematic partial section views of a vehicle interior component according to an exemplary embodiment.
Figure 19C:
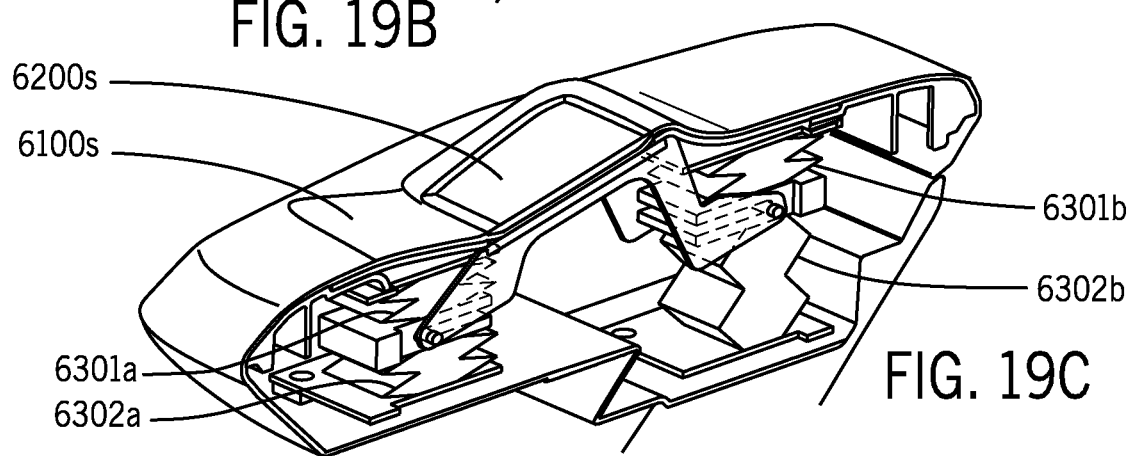
Figure 19D:
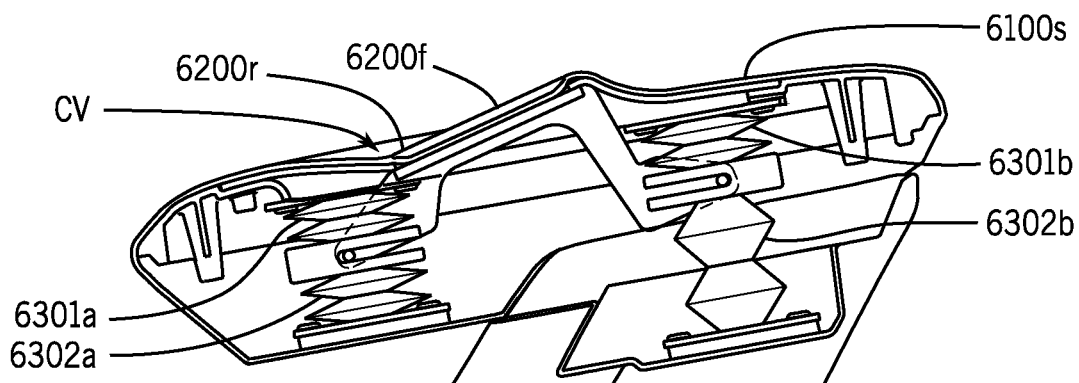
Figure 19E:
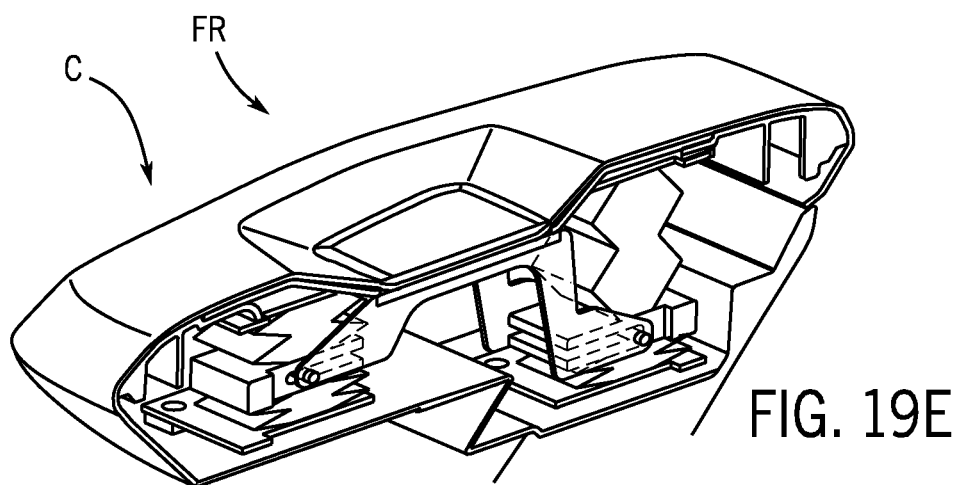
Figure 19F:
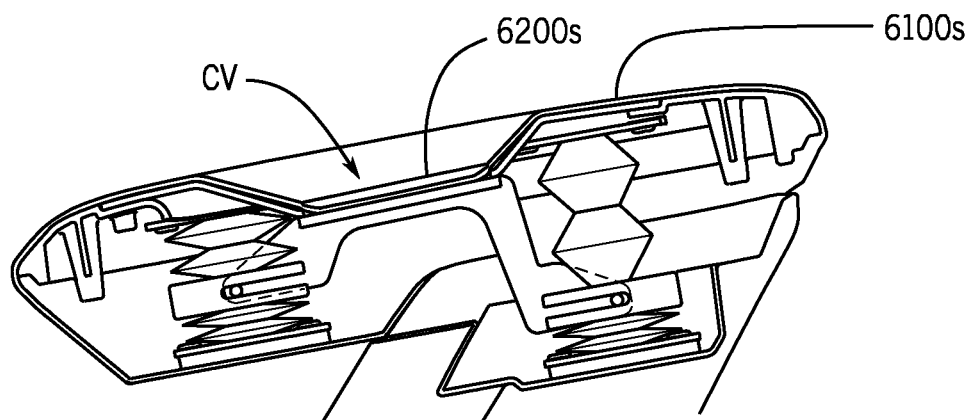
Figure 20A:
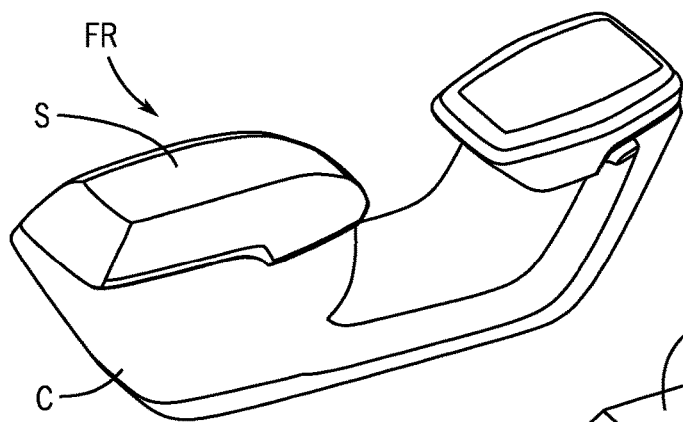
FIGS. 20A through 20D are schematic partial perspective views of a vehicle interior component according to an exemplary embodiment.
Figure 20B:
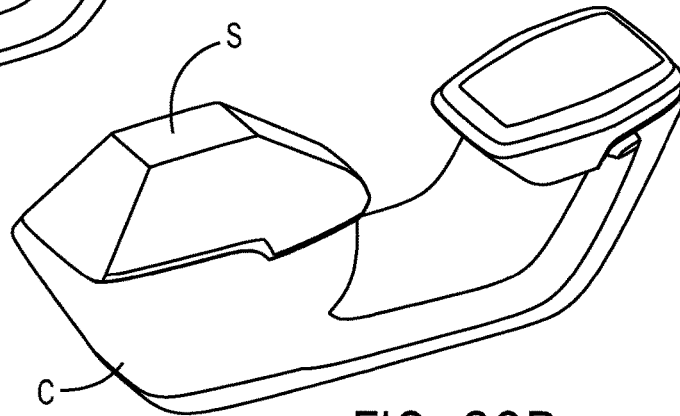
Figure 20C:
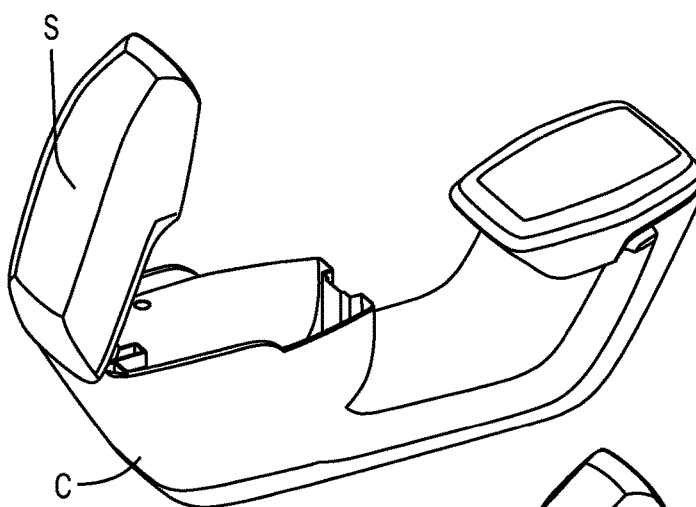
Figure 20D:
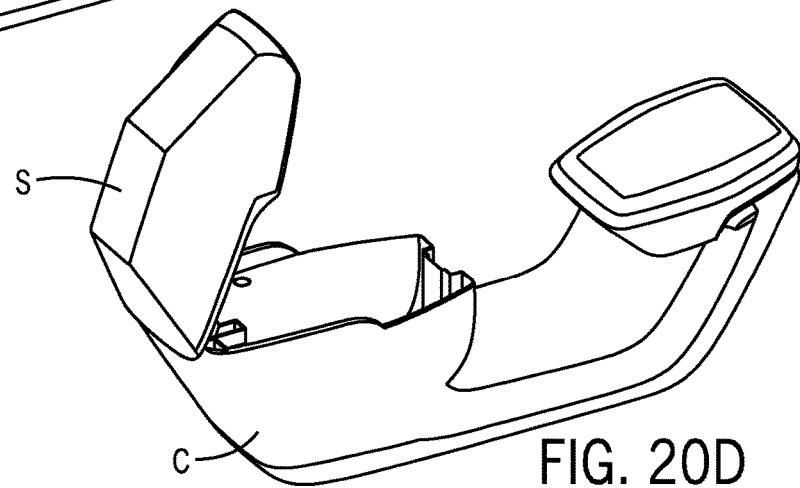
Figure 21:
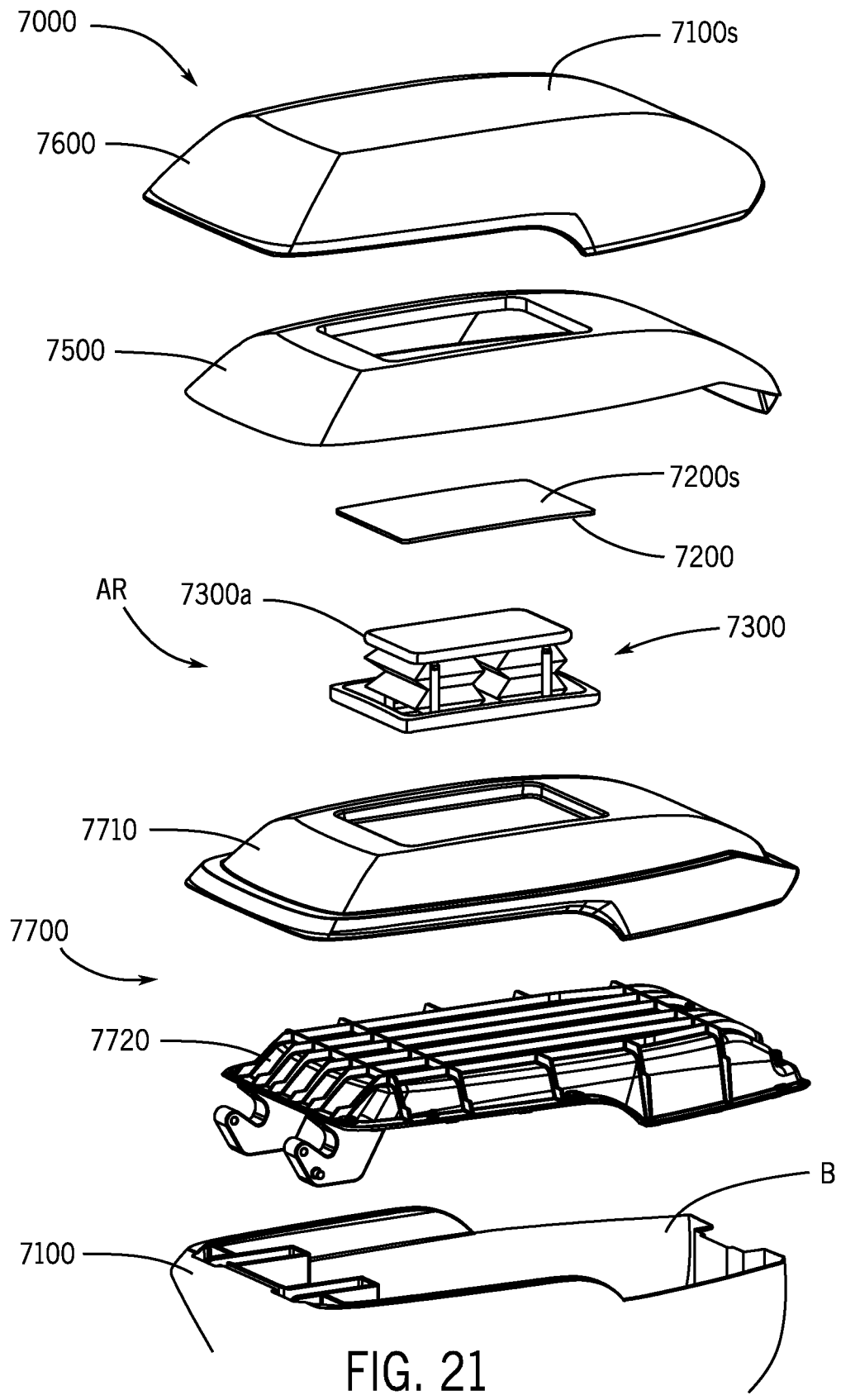
FIG. 21 is a schematic exploded partial perspective view of a vehicle interior component according to an exemplary embodiment.

According to an exemplary embodiment as shown schematically in FIGS. 17A-17C, 18 and 19A-19F, a component C/6000 for a vehicle interior may comprise a base 6100 comprising an outer surface 6100*s*; and a support S/6200 comprising an outer surface 6200*s* and configured to move between a raised position as shown schematically in FIGS. 19A and 19B and a lowered position as shown schematically in FIGS. 19E and 19F. The outer surface 6200*s* of support 6200 and the outer surface 6100*s* of base 6100 may comprise a substantially continuous surface when support 6200 is in the raised position. Support 6200 may be configured to descend into base 6200 to provide a cavity. Component 6000 may comprise a mechanism 6300 configured to move support 6200 between the raised position and the lowered position; support 6200 and base 6100 may provide a cavity when support 6200 is in the lowered position. Support 6200 may comprise a front portion 6200*f* and a rear portion 6200*r*; front portion 6200*f* of support 6200 may be configured to descend into base 6100 by a first distance; rear portion 6200*r* of support 6200 may be configured to descend into base 6100 by a second distance; the second distance may be greater than the first distance. Support 6200 may be configured to rotate relative to base 6100 as support 6200 descends into base 6100. Support 6200 may be configured to rotate and translate relative to base 6100 as support 6200 descends into base 6100. Support 6200 may be configured to (a) rotate relative to base 6100 as support 6200 descends into base 6100; (b) translate relative to base 6100 as support 6200 descends into base 6100. Support 6200 may comprise an arm coupled to base 6100 at a joint; the joint may be spaced away from the outer surface of support 6200. Mechanism 6300 may comprise a motor 6310 and a link; motor 6310 may be configured to rotate the link to move the outer surface of support 6200. The link may comprise a first link 6352 and a second link 6354. Mechanism 6300 may comprise a pump 6312. Component 6000 may comprise a cover 6600; cover 6600 may be configured to move with support 6200 as support 6200 moves between the raised position and the lowered position. Cover 6600 may be configured to extend as support 6200 moves from the raised position toward the lowered position. Cover 6600 may be configured to contract as support 6200 moves from the lowered position toward the raised position. Cover 6600 may comprise a decorative layer and a support layer. Mechanism 6300 may comprise at least one air bladder. The at least one air bladder may be configured to at least one of (a) expand to move support 6200; (b) contract to move support 6200. The at least one air bladder may comprise a first air bladder 6302*a*/6302*b* and a second air bladder 6301*a*/6301*b*. First air bladder 6302*a*/6302*b* may be configured to contract to move support 6200 from the raised position to the lowered position. Second air bladder 6301*a*/6301*b* may be configured to expand to move support 6200 from the raised position to the lowered position. The at least one air bladder may comprise a first upper air bladder 6301*a*, a second upper air bladder 6301*b*, a first lower air bladder 6302*a* and a second lower air bladder 6302*b*. Support 6200 may be configured to rotate relative to base 6100 to provide a cavity CV. Support 6200 may comprise a front portion 6200*f* and a rear portion 6200*r*; support 6200 may be configured for a tilted state with rear portion 6200*r* of support 6200 descended into base 6100 and front portion 6200f of support 6200 extending from base 6100 as shown schematically in FIGS. 19C and 19D. Component 6000 may comprise a first actuator 6300a; a second actuator 6300b and a bracket 6350 coupled to support 6200, first actuator 6300a and second actuator 6300b. First actuator 6300a and second actuator 6300b may be configured to (a) rotate bracket 6350 to rotate support 6200; (b) translate bracket 6350 to translate support 6200. Component 6000 may comprise a cover 6600; a frame 6120/6130 and a gasket 6500 coupled to frame 6120/6130. Cover 6600 and gasket 6500 may be configured to move with support 6200 and bracket 6350 relative to frame 6120/6130. Support 6200 may be configured to extend through at least one aperture in cover 6600 and at least one aperture in gasket 6500 to couple with bracket 6350. Component 6000 may comprise at least one of (a) a console; (b) a floor console; (c) a tunnel console; (d) an armrest; (e) an instrument panel; (f) a door; (g) a door panel.

Figure 22A:
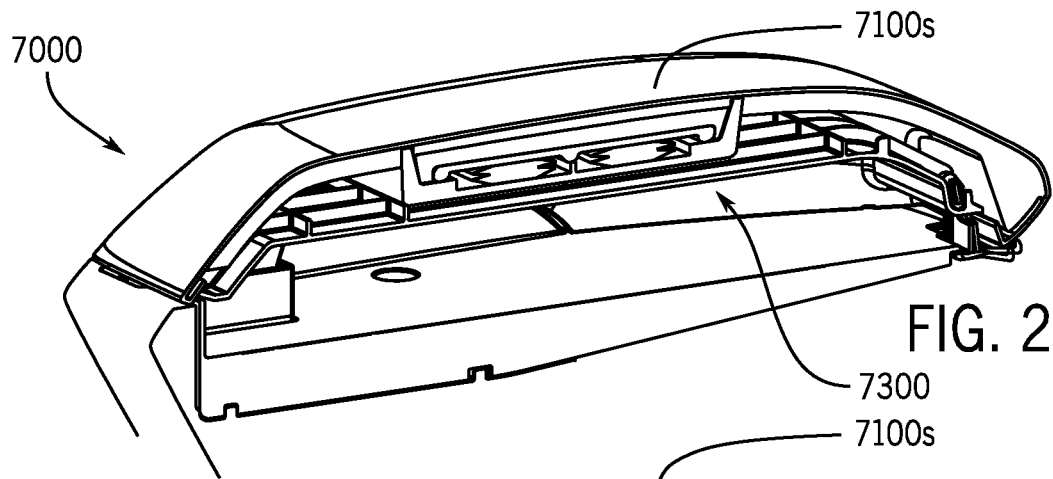
FIGS. 22A and 22C are schematic partial perspective views of a vehicle interior component according to an exemplary embodiment.
Figure 22B:
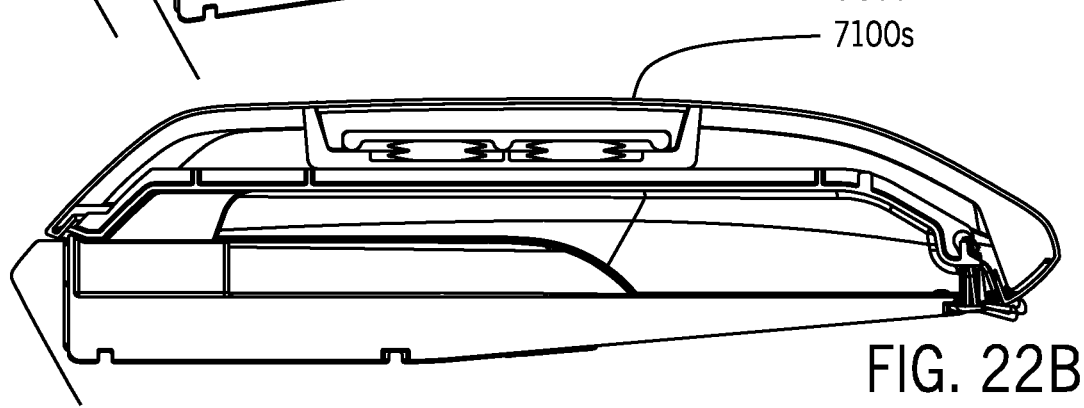
FIGS. 22B and 22D are schematic partial section views of a vehicle interior component according to an exemplary embodiment.
Figure 22C:
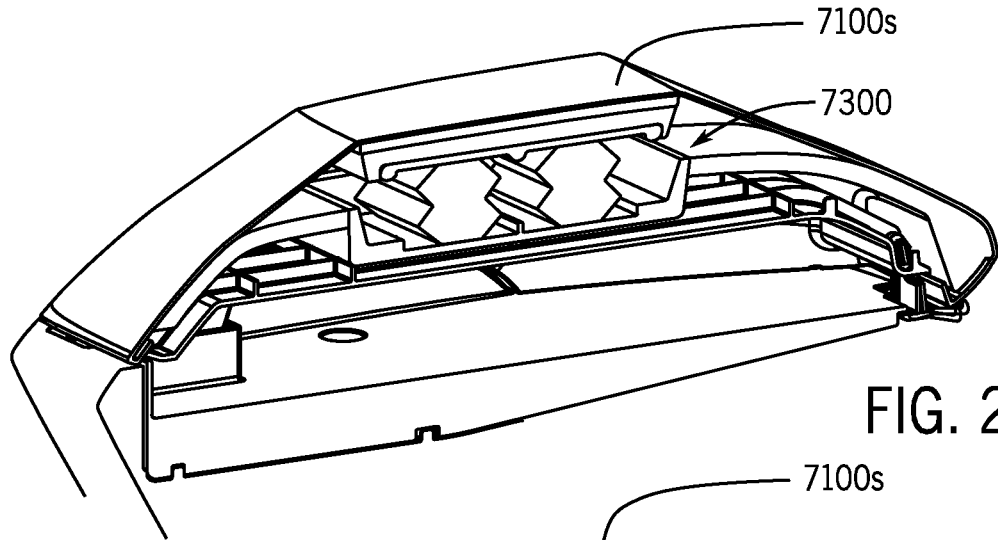
Figure 22D:
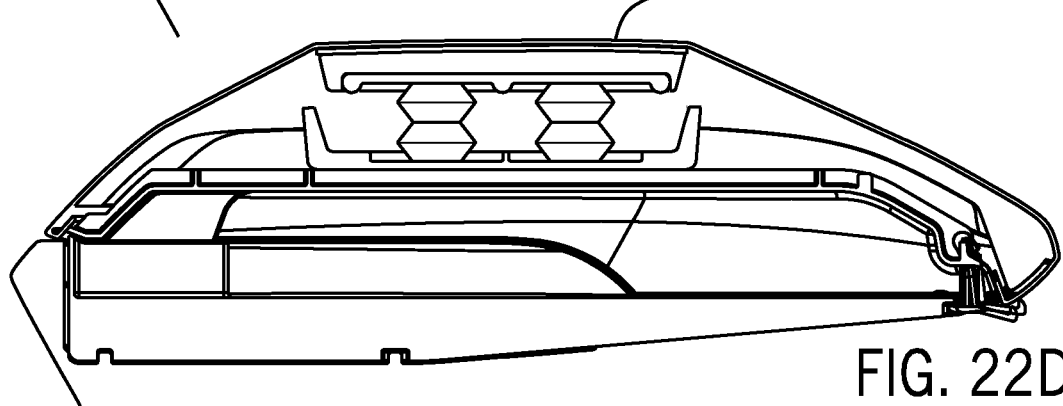

According to an exemplary embodiment as shown schematically in FIGS. 20A-20D, 21, 22A-22D, a component 7000 for a vehicle interior may comprise a base 7100 comprising an outer surface 7100s; and a support 7200 comprising an outer surface 7200s and configured to move between a raised position as shown schematically in FIGS. 22C and 22D and a lowered position as shown schematically in FIGS. 22A and 22B. Outer surface 7200s of support 7200 and outer surface 7100s of base 7100 may comprise a substantially continuous surface when support 7200 is in the lowered position. Outer surface 7200s of support 7200 and outer surface 7100s of base 7100 may comprise a substantially continuous surface when support 7200 is in the raised position. Component 7000 may comprise a cover 7600; cover 7600 may be configured to move with support 7200 as support 7200 moves between the raised position and the lowered position. Cover 7600 may be configured to extend as support 7200 moves from the lowered position toward the raised position. Cover 7600 may be configured to contract as support 7200 moves from the raised position toward the lowered position. Cover 7600 may comprise a decorative layer and a support layer. Cover 7600 may comprise at least one of (a) an elastomer; (b) an olefin: (c) a thermoplastic material; (d) a synthetic rubber; (e) neoprene; (f) a thermoplastic olefin; (g) a thermoplastic elastomer. Cover 7600 may be configured to provide a force to move support 7200 from the raised position toward the lowered position. Component 7000 may comprise a mechanism 7300 configured to move support 7200 between the raised position and the lowered position; support 7200 may be configured to protrude from base 7100 when support 7200 is in the raised position. Mechanism 7300 may comprise at least one air bladder. The at least one air bladder may be configured to at least one of (a) expand to move support 7200; (b) contract to move support 7200. Mechanism 7300 may comprise at least one pneumatic actuator. Mechanism 7300 may comprise at least one pump and at least one valve. Component 7000 may comprise a bin B and a lid AR configured to move between (a) a closed position to cover bin B as shown schematically in FIGS. 20A and 20B and (b) an open position to uncover bin B as shown schematically in FIGS. 20C and 20D; lid AR may comprise base 7100 and support 7200. Support 7200 may be configured to move between the raised position and the lowered position when lid AR is in the closed position and the open position. See FIGS. 20A-20D. Component 7000 may comprise at least one of (a) a console; (b) a floor console; (c) a tunnel console; (d) an armrest; (e) an instrument panel; (f) a door; (g) a door panel.

According to an exemplary embodiment as indicated schematically in FIGS. 1C-1H, 2M-2V, 10A-10H, 14A-14D, 16A-16D, 17A-17C, 19A-19F, 20A-20B and 22A-22D, the functional region may comprise an adaptive volume mechanism. See also FIGS. 23 and 24, According to an exemplary embodiment as indicated schematically in FIGS. 1E and 1G-1H, the base of the component may comprise a functional region providing a substantially continuous surface; the functional region may be configured to present a first form and a second form; the first form may comprise a default volume for the base; the second form may comprise an expanded volume for the base. See also FIGS. 2M-2V, 10A-10H, 14A-14D, 16A-16D, 17A-17C, 19A-19F, 20A-20B and 22A-22D, As indicated schematically in FIGS. 2M-2V, 10A-10H, 14A-14D, 16A-16D, 17A-17C, 19A-19F, 20A-20B and 22A-22D, the base may comprise a functional region providing the substantially continuous surface; the functional region may be configured to present a first form and a second form; in the first form the base may be configured to occupy a default volume in the vehicle interior; in the second form the base may be configured to comprise an enlarged volume larger than the default volume. As indicated schematically in FIGS. 17A-17C, the second form may comprise a reduced volume smaller than the default volume; the first form may comprise the default volume. According to an exemplary embodiment as indicated schematically in FIGS. 2M-2V, 10A-10H, 14A-14D, 16A-16D, 17A-17C, 19A-19F, 20A-20B and 22A-22D, the first form may comprise a first shape and the second form may comprise a second shape.

According to an exemplary embodiment as indicated schematically in FIGS. 2A-2L, 3A-3F, 4A-4F, 7A-7F, 9A-9F and 17A-17C, the base may comprise a functional region providing the substantially continuous surface; the functional region may be configured to present a first form and a second form; the second form may comprise a receptacle in the base; the first form may comprise the absence of the receptacle for the second form. As indicated schematically, the functional region may comprise a platform movable relative to the base; the platform may be configured for movement relative to the base between an elevated state and a lowered state; the platform may be in an elevated state for the default form; the platform may be in a lowered state for the second form. See FIGS. 2A-2L, 3A-3F and 4A-4F. According to an exemplary embodiment as indicated schematically in FIGS. 3C and 4C, the platform may comprise an illuminated platform. According to an exemplary embodiment as indicated schematically in FIGS. 4A-4F, the platform may be configured to be presented at a first orientation and a second orientation; in the first orientation the platform may be generally horizontal; in the second orientation the platform may be generally tilted. As indicated schematically in FIGS. 3A-3F and 4A-4F, the first form may comprise a default form. According to an exemplary embodiment as indicated schematically in FIGS. 1B-1H, the base may comprise a cover providing an exterior surface; the exterior surface may be substantially continuous when in the default form; the exterior surface provides a receptacle when in the second form.

According to an exemplary embodiment as shown schematically in FIGS. 1C-1F, the component C for a vehicle interior may comprises a base structure comprising a functional region S/FR; the functional region may be configured to present a first form and a second form; the second form may comprise a receptacle in the base structure. See also FIGS. 2A-2L, 3A-3F, 4A-4F, 7A-7F, 9A-9F and 17A-17C. As indicated schematically in FIGS. 3A-3F and 4A-4F, the functional region may comprise a platform/base S movable relative to the base structure of the component C; the base structure may comprise an illuminated section for the functional region. See FIGS. 3C, 4C and 24. As indicated schematically in FIGS. 1F, 3C and 4C, the base structure may comprise an illuminated section at the functional region (e.g. at the perimeter of the receptacle, etc.)

Figure 4A:
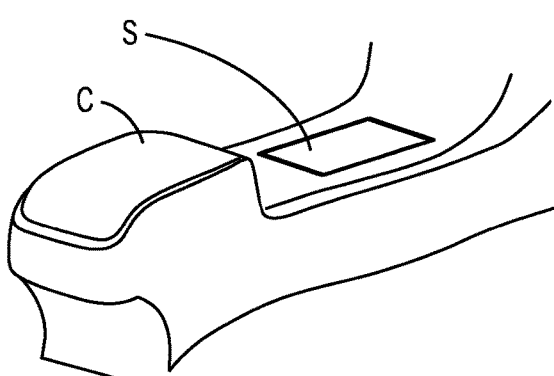
FIGS. 4A through 4F are schematic perspective views of a vehicle interior component shown as a console assembly according to an exemplary embodiment.
Figure 4B:
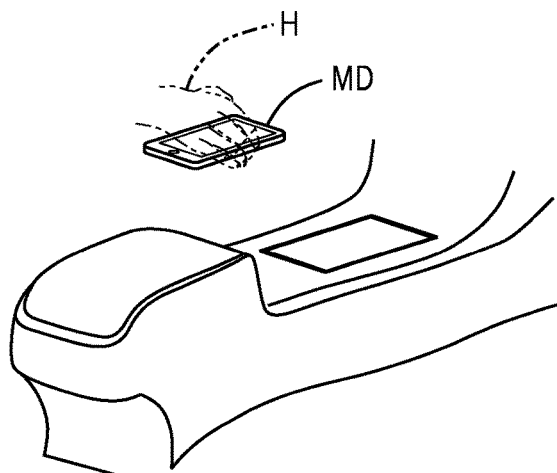
Figure 4C:
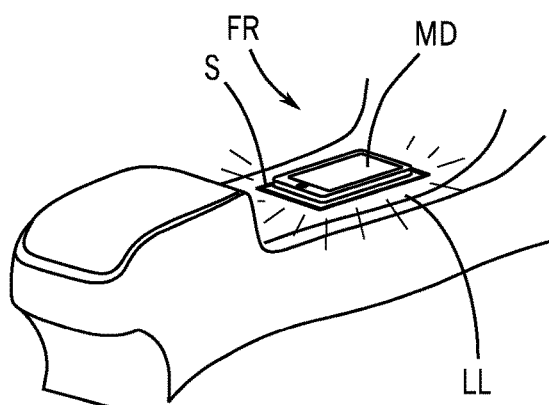
Figure 4D:
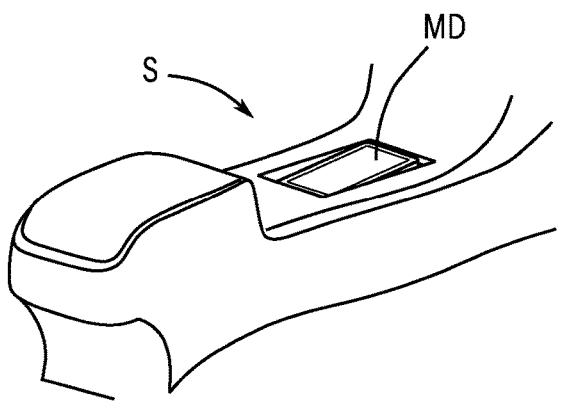
Figure 4E:
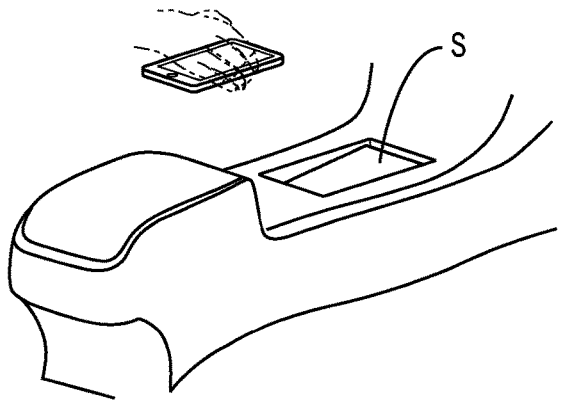
Figure 4F:
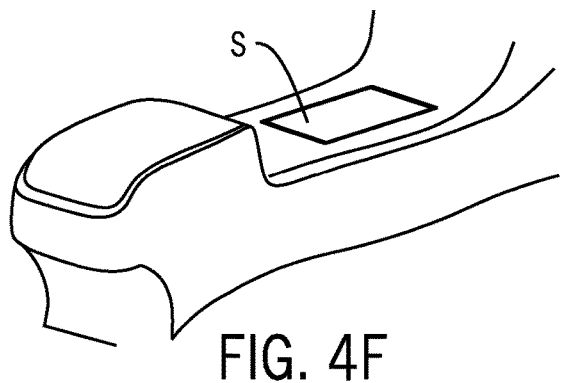
Figure 6A:
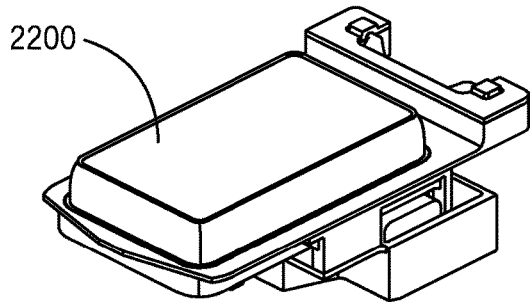
FIGS. 6A and 6B are schematic partial perspective views of a vehicle interior component according to an exemplary embodiment.
Figure 6D:
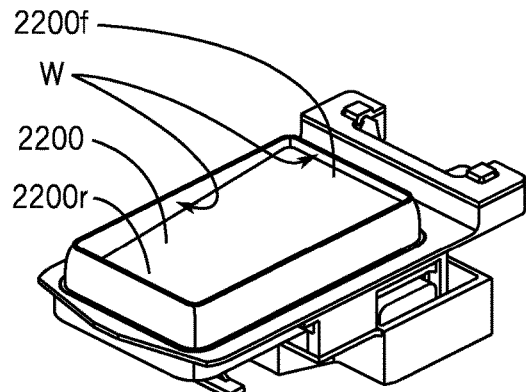
FIGS. 6D and 6E are schematic partial perspective views of a vehicle interior component according to an exemplary embodiment.
Figure 6B:
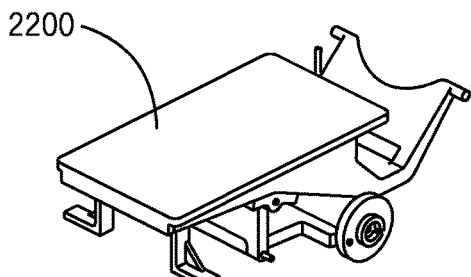
Figure 6E:
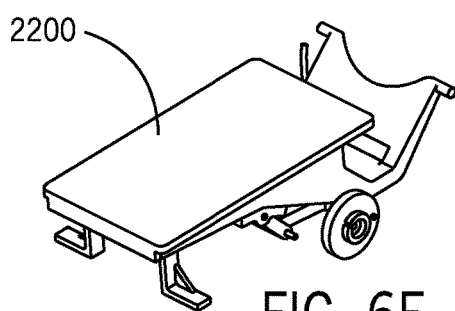
Figure 6C:
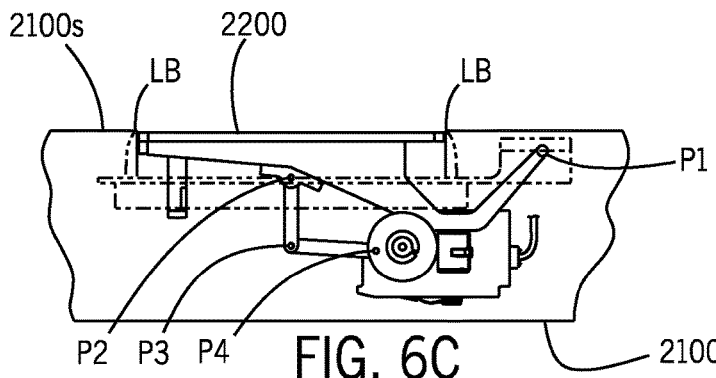
FIG. 6C is a schematic partial side view of a vehicle interior component according to an exemplary embodiment.
Figure 6F:
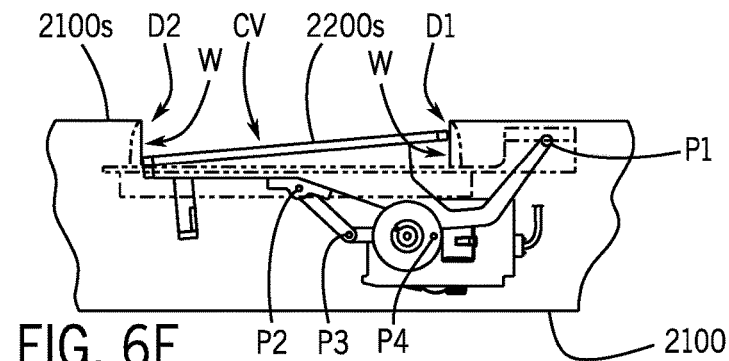
FIG. 6F is a schematic partial side view of a vehicle interior component according to an exemplary embodiment.
Figure 7A:
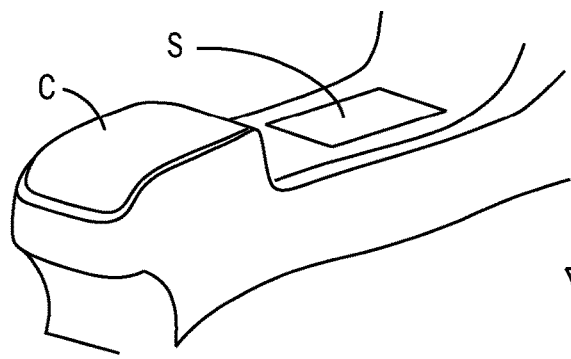
FIGS. 7A through 7C are schematic partial perspective views of a vehicle interior component according to an exemplary embodiment.
Figure 7D:
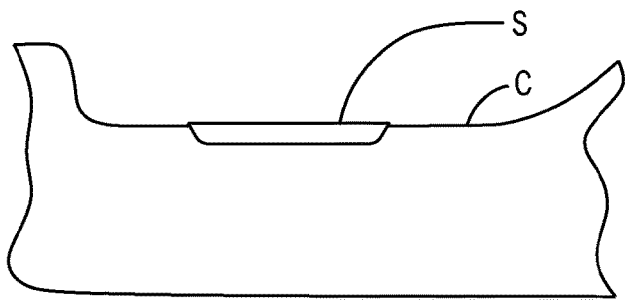
FIGS. 7D through 7F are schematic partial section views of a vehicle interior component according to an exemplary embodiment.
Figure 7B:
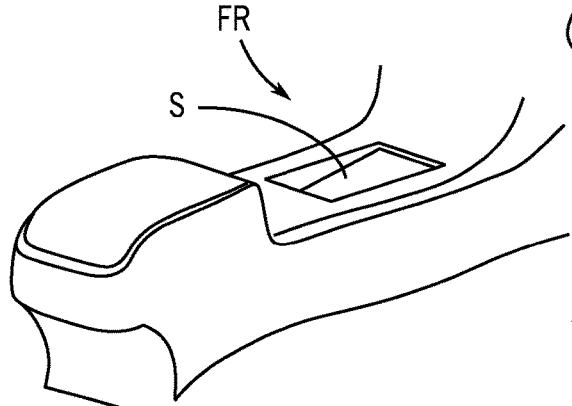
Figure 7E:
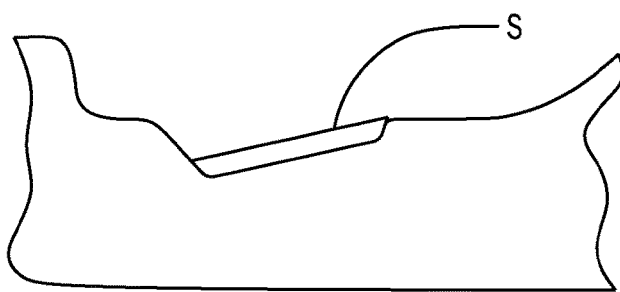
Figure 7C:
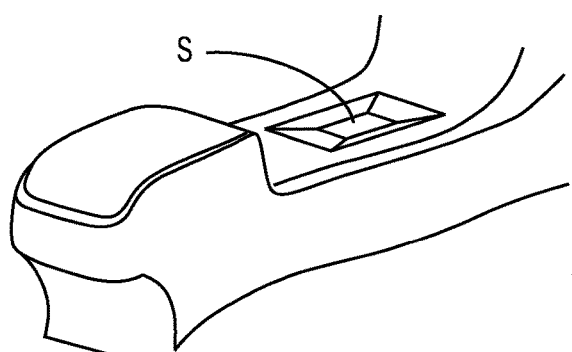
Figure 7F:
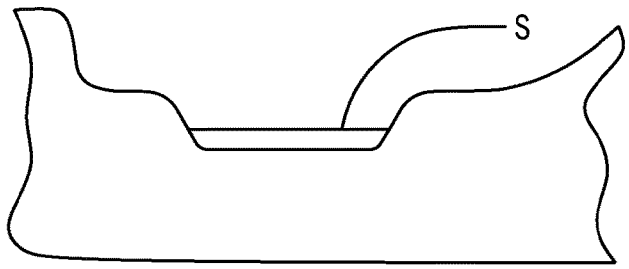
Figure 9A:
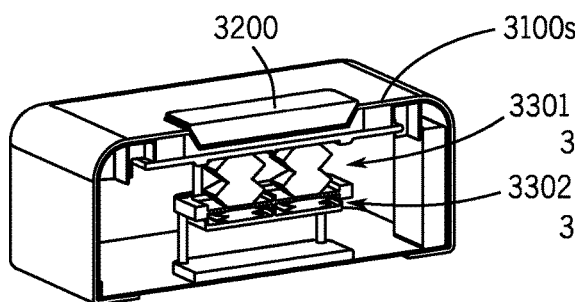
FIGS. 9A, 9C and 9E are schematic partial perspective views of a vehicle interior component according to an exemplary embodiment.
Figure 9B:
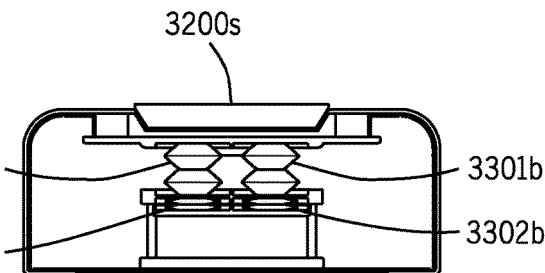
FIGS. 9B, 9D and 9F are schematic partial side views of a vehicle interior component according to an exemplary embodiment.
Figure 9C:
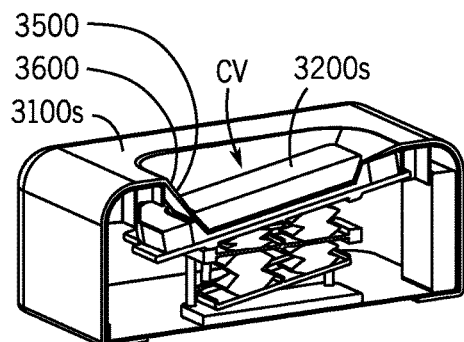
Figure 9D:
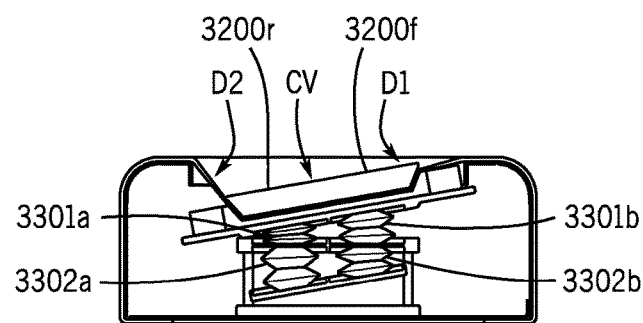
Figure 9E:
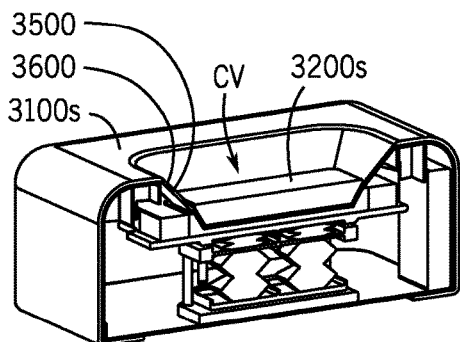
Figure 9F:
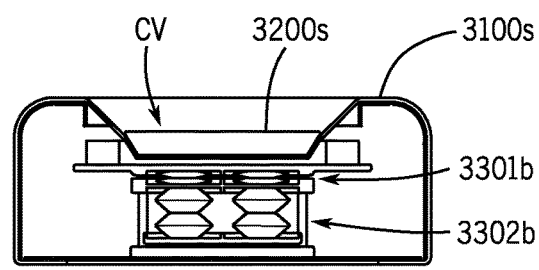
Figure 10A:
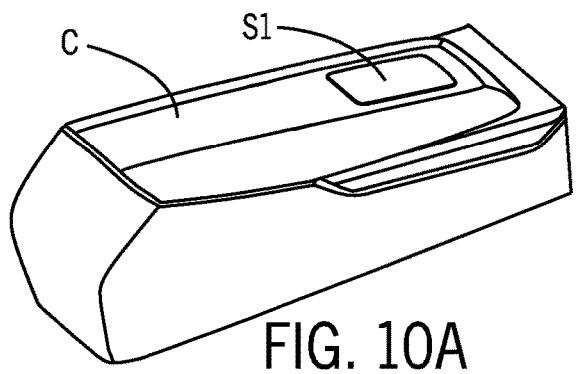
FIGS. 10A through 10D are schematic partial perspective views of a vehicle interior component according to an exemplary embodiment.
Figure 10E:
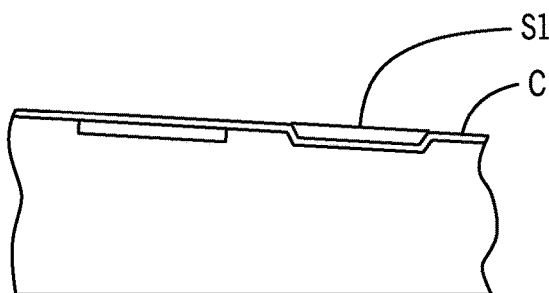
FIGS. 10E through 10H are schematic section views of a vehicle interior component according to an exemplary embodiment.
Figure 10B:
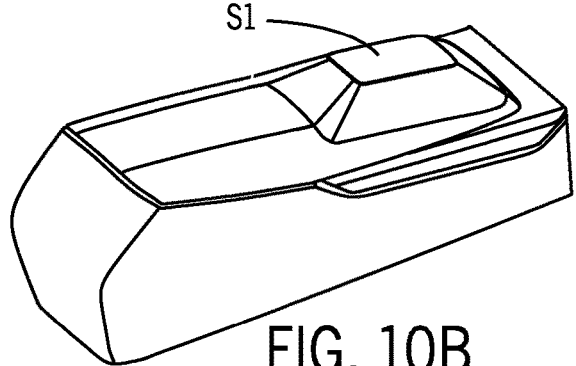
Figure 10F:
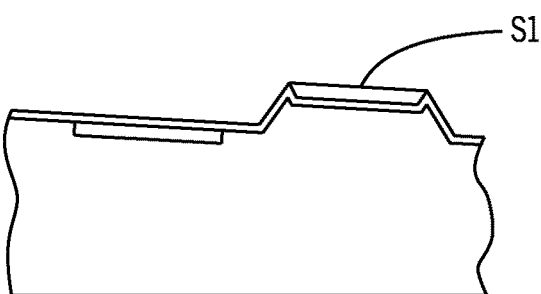
Figure 10C:
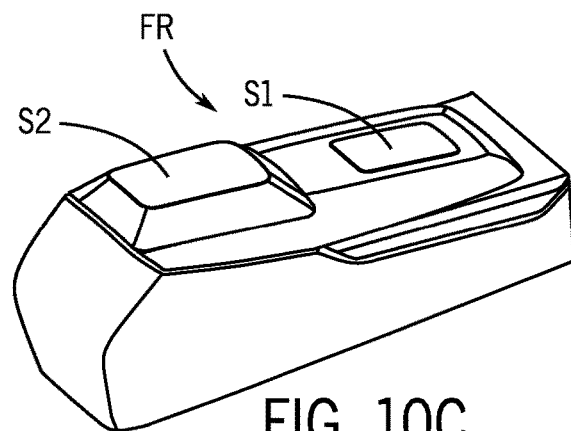
Figure 10G:
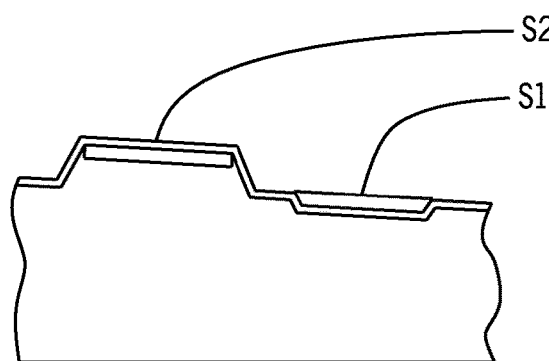
Figure 10D:
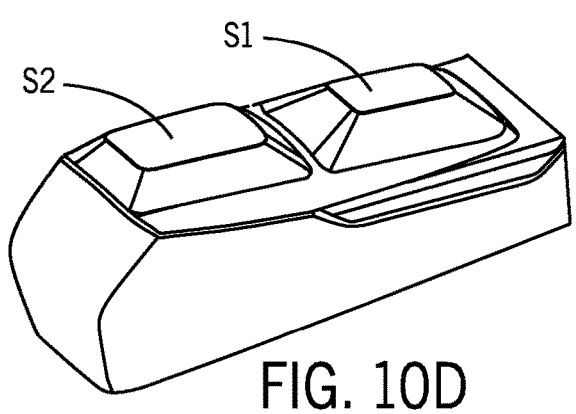
Figure 10H:
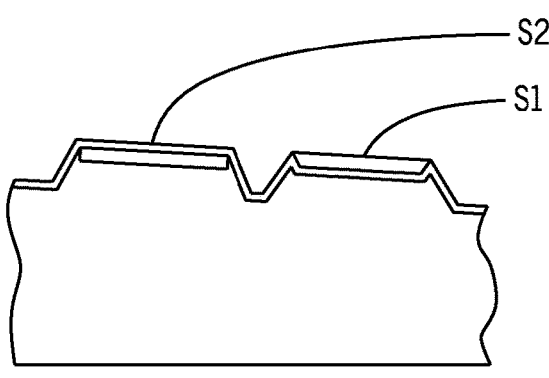
Figure 12A:
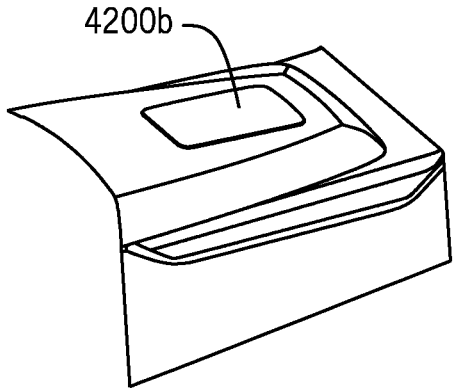
FIGS. 12A, 12B, 12D and 12E are schematic partial perspective views of a vehicle interior component according to an exemplary embodiment.
Figure 12D:
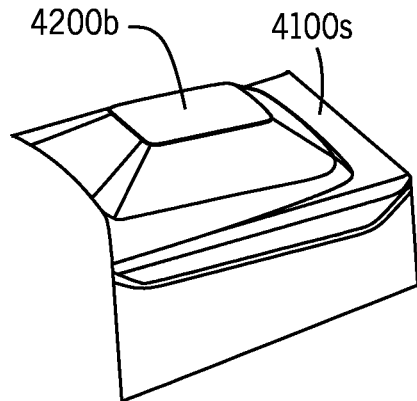
Figure 12B:
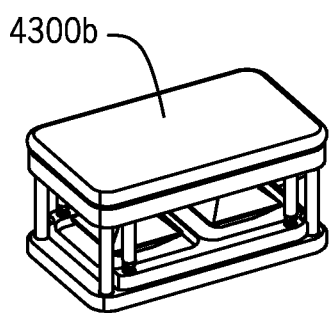
Figure 12E:
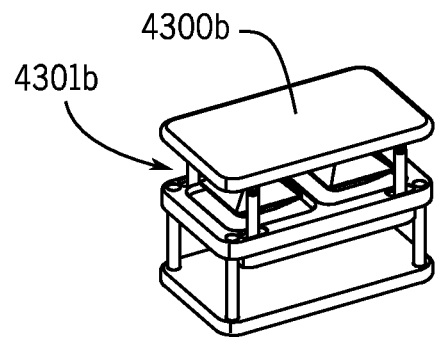
Figure 12C:
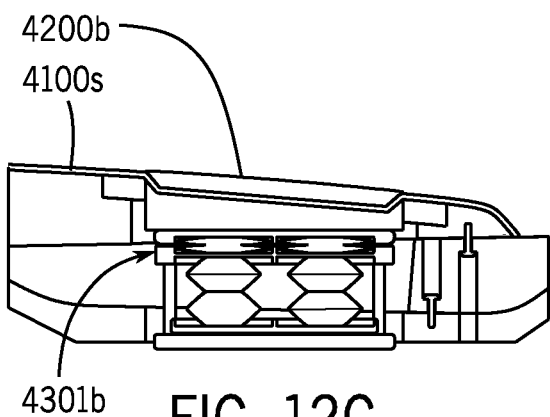
FIGS. 12C and 12F are schematic partial side views of a vehicle interior component according to an exemplary embodiment.
Figure 12F:
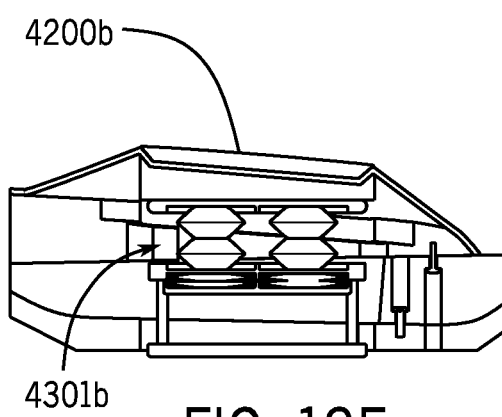
Figure 13A:
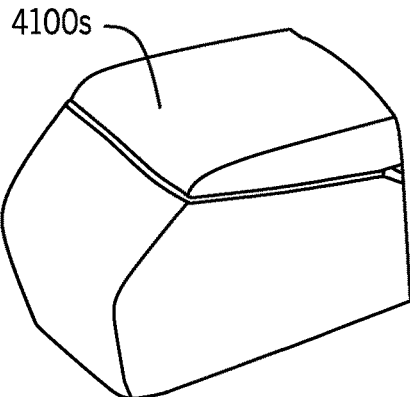
FIGS. 13A, 13B, 13D and 13E are schematic partial perspective views of a vehicle interior component according to an exemplary embodiment.
Figure 13D:
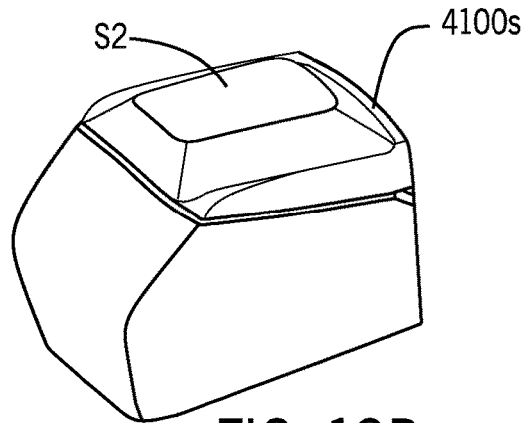
Figure 13B:
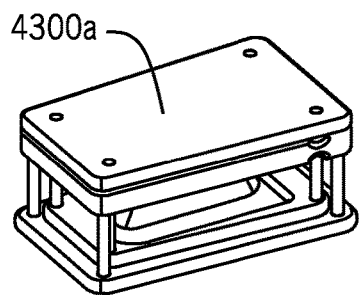
Figure 13E:
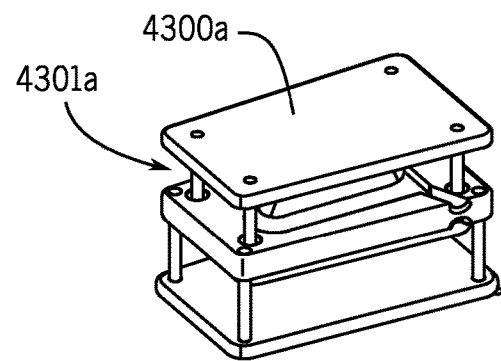
Figure 13C:
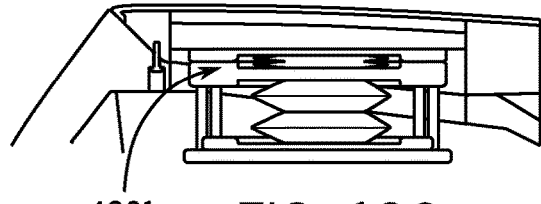
FIGS. 13C and 13F are schematic partial side views of a vehicle interior component according to an exemplary embodiment.
Figure 13F:
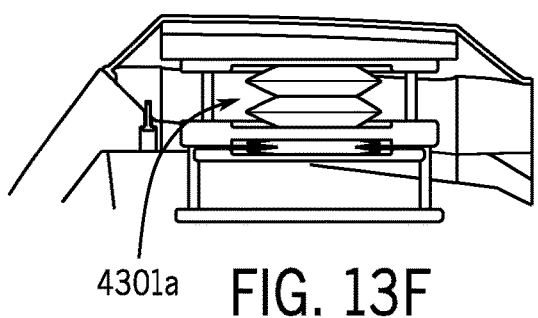
Figure 14A:
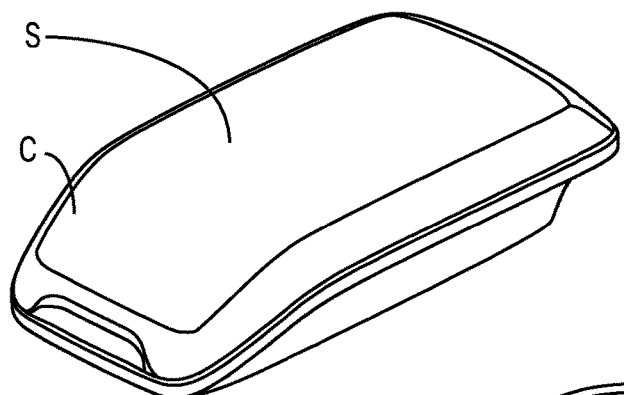
FIGS. 14A and 14B are schematic partial perspective views of a vehicle interior component according to an exemplary embodiment.
Figure 14C:
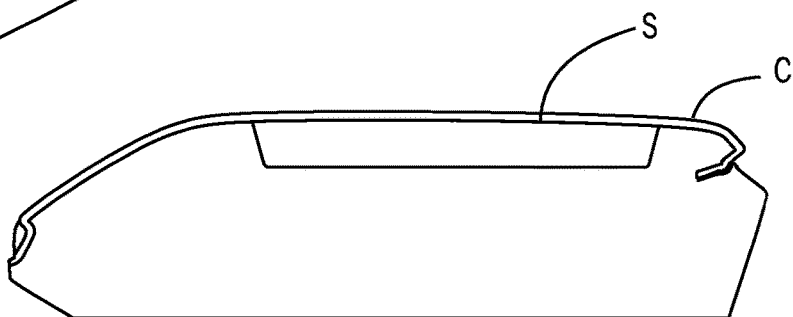
FIGS. 14C and 14D are schematic section views of a vehicle interior component according to an exemplary embodiment.
Figure 14B:
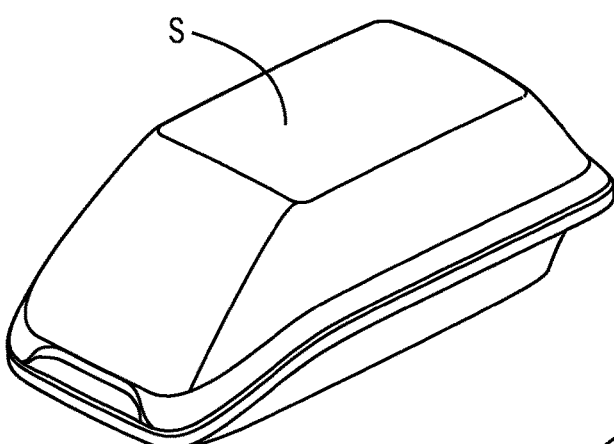
Figure 14D:
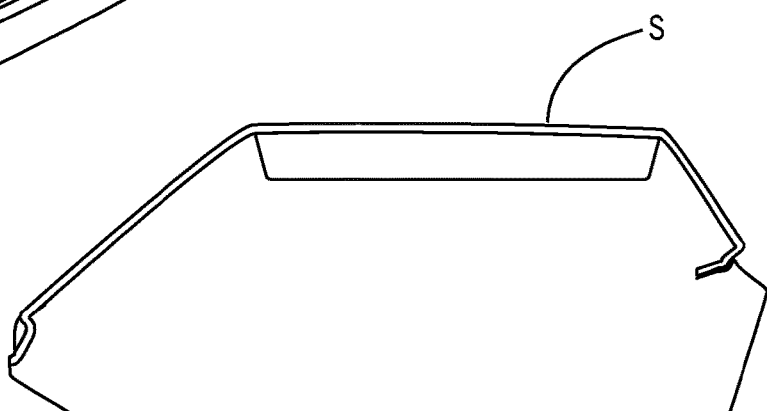
Figure 16A:
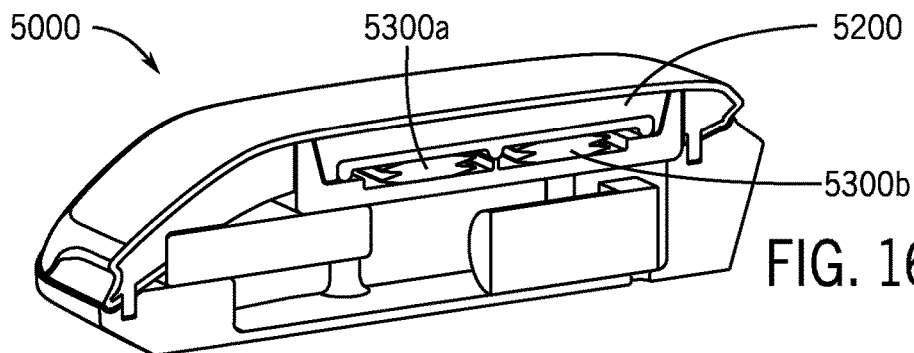
FIGS. 16A and 16C are schematic partial perspective views of a vehicle interior component according to an exemplary embodiment.
Figure 16B:
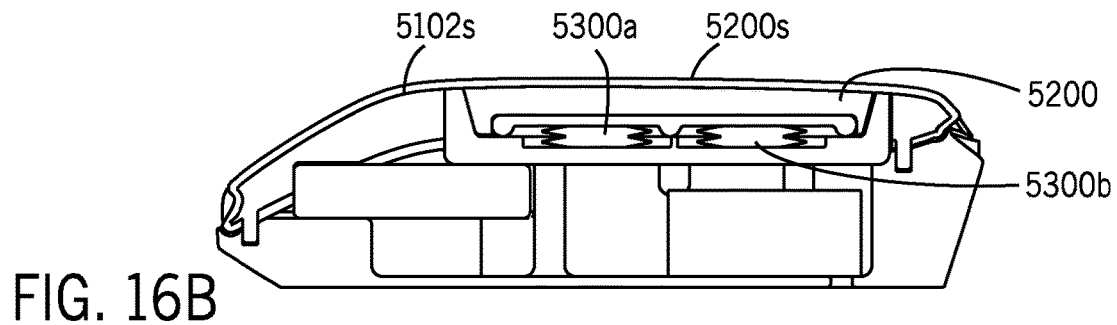
FIGS. 16B and 16D are schematic partial side views of a vehicle interior component according to an exemplary embodiment.
Figure 16C:
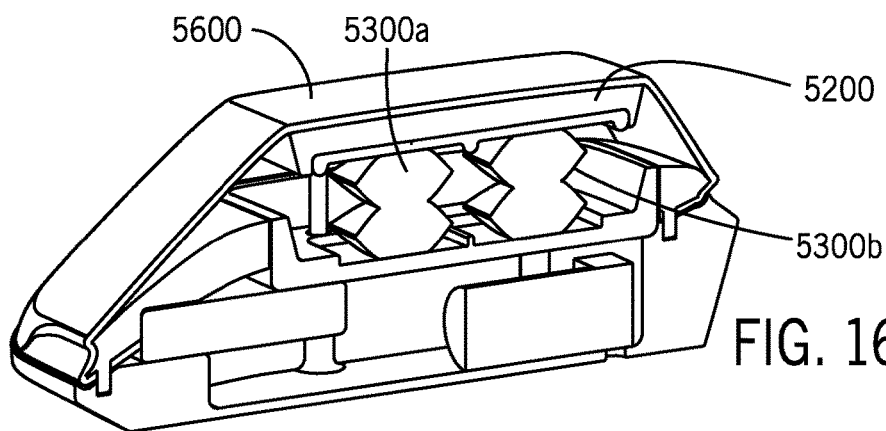
Figure 16D:
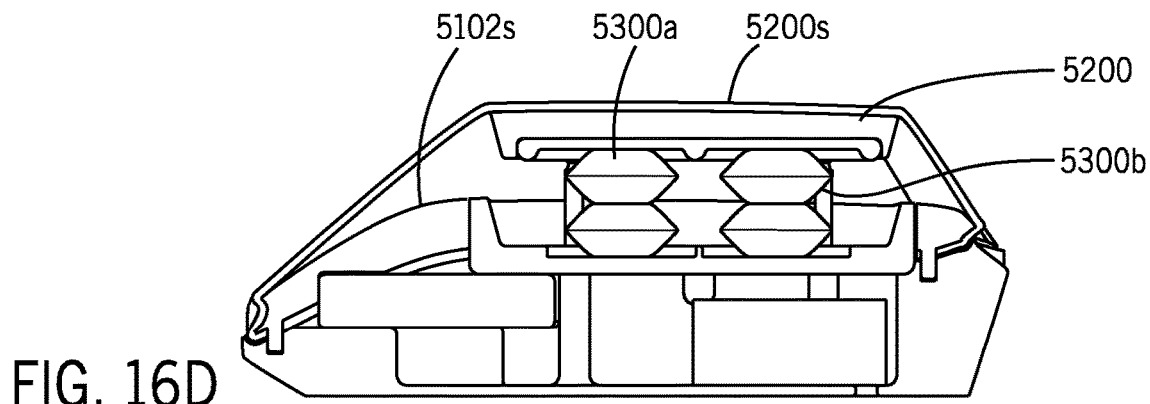
Figure 18:
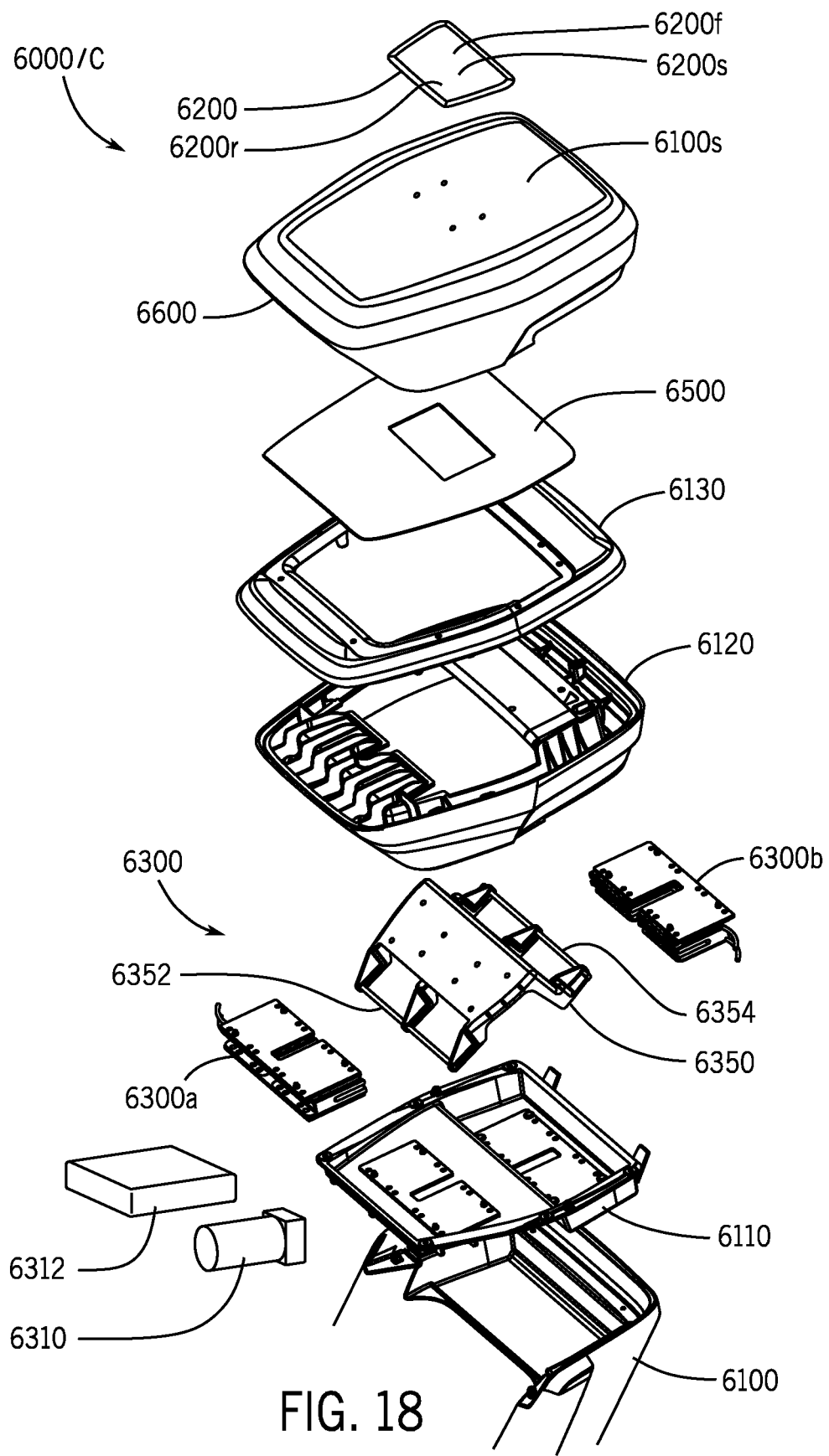
FIG. 18 is a schematic exploded partial perspective view of a vehicle interior component according to an exemplary embodiment.

According to an exemplary embodiment as indicated schematically in FIGS. 3A and 4A, the functional region may be in the default form when not in use. See also FIGS. 10A, 14A, 17A and 20A. As indicated schematically in FIGS. 3A-3F and 4A-4F, the default form may comprise the absence of the receptacle for the second form.

According to an exemplary embodiment as indicated schematically in FIGS. 1C-1H, 8A, 15A, 18 and 21, the base structure of the component may comprise a cover providing an exterior surface; the exterior surface may be substantially continuous when in the default form. As indicated schematically, the exterior surface provides a receptacle when in the second form. See FIGS. 3A-3F, 4A-4F, 6A-6F, 7A-7F and 17A-17C.

According to an exemplary embodiment as indicated schematically in FIGS. 5A-5C, 8A-8B, 15A-15B, 23 and 24, the component may comprise a control system configured to operate the functional region. As indicated schematically according to an exemplary embodiment in FIGS. 1C-1H, 23 and 24, the component may comprise a control system and an actuator configured to provide functionality for the functional region such as providing a receptacle for an object and/or adaptive volume, etc. See also FIGS. 2A-2V, 3A-3F, 4A-4F, 7A-7F, 9A-9F, 10A-10H, 14A-14D, 16A-16D, 17A-17C, 19A-19F, 20A-20B and 22A-22D. As indicated schematically in FIGS. 3A-3F, 4A-4F and 23, the control system may be coupled to a sensor/switch (e.g. detector, etc.) configured to detect an object or control action from a vehicle occupant such as placement/positioning of an object (e.g. container R, mobile device MD, etc.) at or near the functional region of the component; the functional region may be configured to provide illumination (shown as light signal LL in FIGS. 3C and 4C) as an indicator and/or guidance. See also FIGS. 1F and 24. As indicated schematically in FIGS. 1D-1F and 24, the functional region FR of the component may be configured to provide a connection to an electronic device (e.g. mobile device) such as for wireless charging, networking, etc. See also FIGS. 4B-4D (showing mobile device MD connected at functional region/support S for wireless charging at component C).

As indicated schematically in FIGS. 5A-5C, 8A-8B, 15A-15B, 23 and 24, the actuator may be configured to operate the functional region; the control system may be configured to operate the actuator. According to an exemplary embodiment as indicated schematically in FIGS. 23, 24 and 25, the control system may be configured to operate the functional region in a cycle; the cycle may comprise detection of an object; the cycle may comprise configuring the functional region to the second form; the cycle may comprise returning the functional region to the first form. See also FIGS. 3A-3F and 4A-4F. As indicated schematically in FIGS. 1C-1F, 3A-3F and 4A-4F, the object may comprise at least one of a container and/or an electronic device; detection of the object may comprise at least one of detection of a force and/or detection of an electronic signal. See also FIGS. 23, 24 and 25. According to an exemplary embodiment as indicated schematically in FIGS. 4A-4F and 24, the electronic signal may comprise detection of wireless charging capability for the electronic device; the functional region may comprise wireless charging capability.

According to an exemplary embodiment as indicated schematically in FIGS. 3A-3F, 4A-4F and 24, the control system may be configured to provide a first illumination in a segment of the functional region when the object may be in a first state and a second illumination when the object may be in a second state; the first state may comprise the object adjacent to the segment; the second state may comprise the object at the segment. See also FIG. 25 (process flow diagram according to an exemplary embodiment).

According to an exemplary embodiment as indicated schematically in FIGS. 3G-3O, 5A-5C, 6A-6F, 9A-9F, 12A-12F, 13A-13F, 16A-16D, 19A-19F and 22A-22D, the component may comprises an actuator configured to operate a mechanism for the functional region; the mechanism may comprise a linkage; the actuator may comprise a motor; the actuator may comprise a pneumatic actuator; the mechanism may comprise a bladder.

Figure 23:
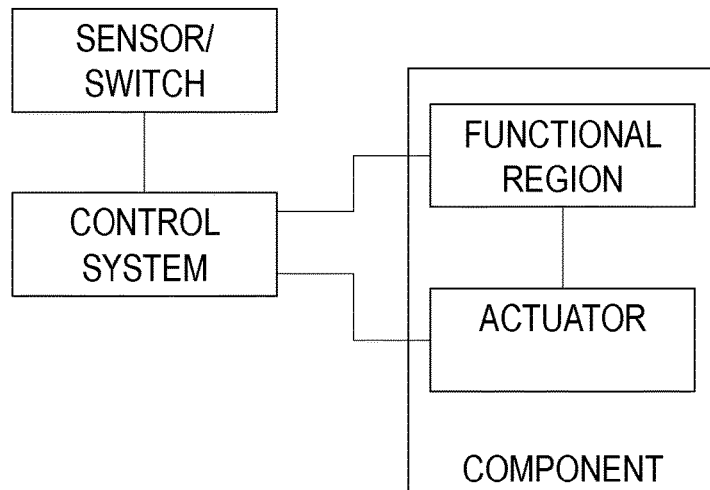
FIG. 23 is a schematic block diagram of a vehicle interior component according to an exemplary embodiment.
Figure 24:
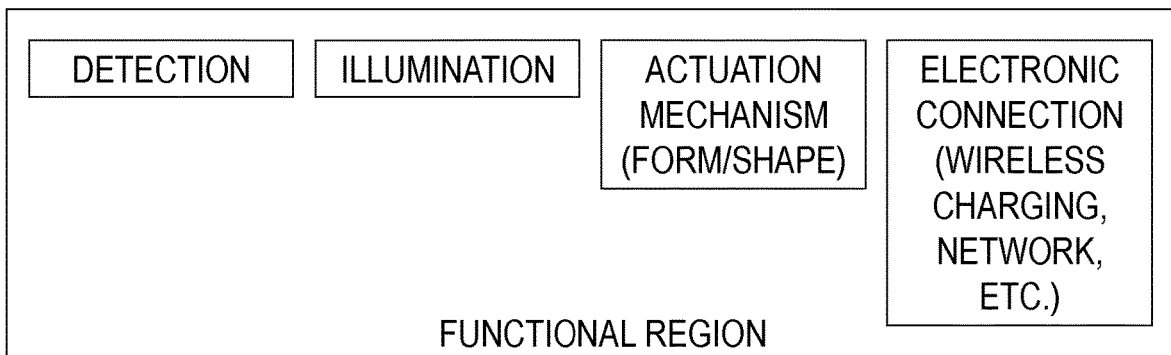
FIG. 24 is a schematic block diagram of a vehicle interior component according to an exemplary embodiment.
Figure 25:
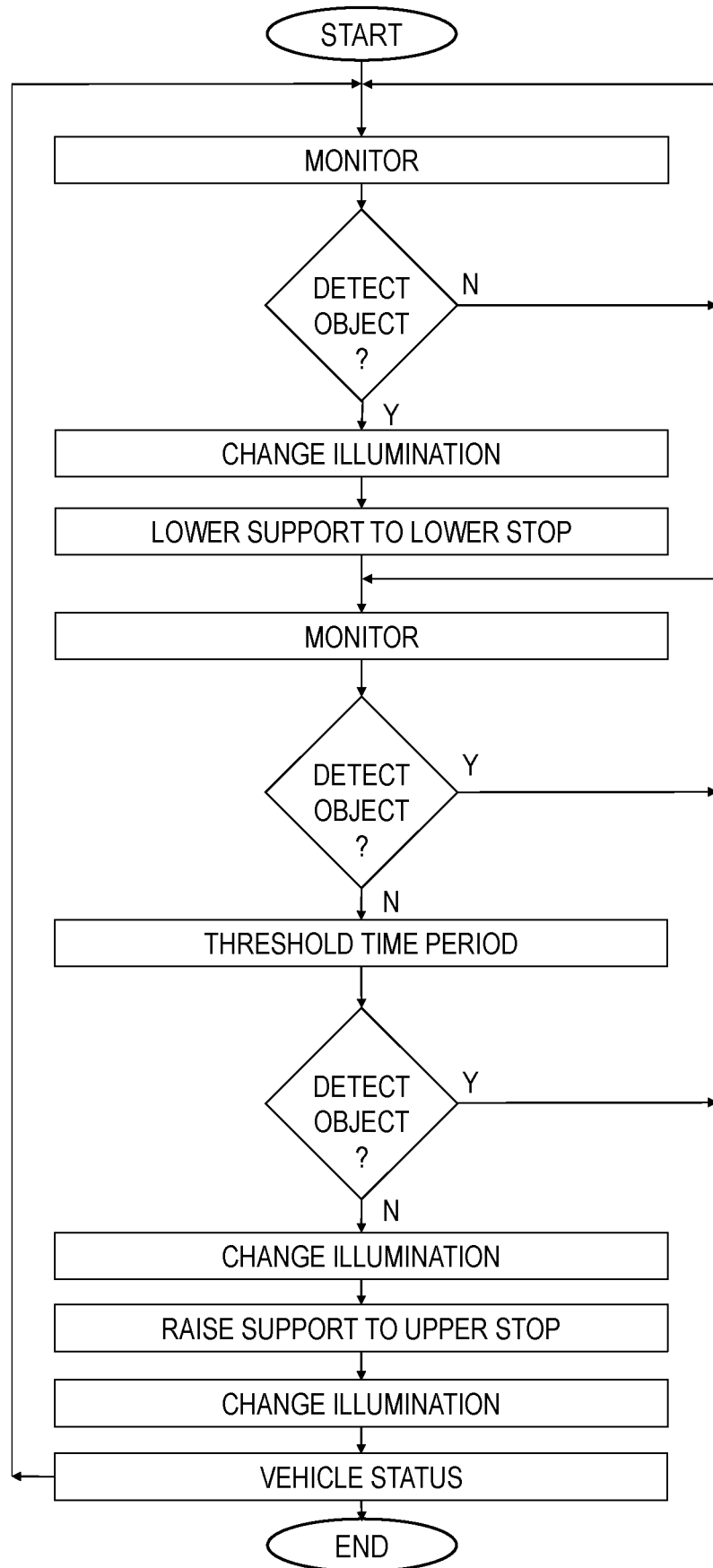
FIG. 25 is a schematic flow diagram of operation of a vehicle interior component according to an exemplary embodiment.

According to an exemplary embodiment as indicated schematically in FIGS. 23, 24 and 25, the control system may be configured to operate the functional region in a cycle; the cycle may comprise at least one of (a) detection of an object; (b) configuring the functional region to the second form; (c) returning the functional region to the default form. See also FIGS. 3A-3F and 4A-4F. As indicated schematically in FIGS. 23 and 24, the sensor may be configured for detection of an object. See also FIG. 25.

According to an exemplary embodiment as indicated schematically in FIG. 25, detection of the object may comprise at least one of (a) detection of a force; (b) detection of a mass of the object; the functional region may be configured to present a receptacle for the object upon detection of an object by the sensor; the functional region may be configured to return to a default form without detection of an object; the functional region may be configured to return to the default form after a threshold time. Compare FIGS. 3A-3F and 4A-4F.

According to an exemplary embodiment as indicated schematically in FIGS. 3A-3F, 4A-4F, 23, 24 and 25, when an object providing a threshold force may be detected by the sensor the functional region presents the second form and when the object may be removed the functional region presents a default form. According to an exemplary embodiment as indicated schematically in FIGS. 4A-4F, the object may comprise an electronic device and detection of the object may comprise detection of a signal from the electronic device; the signal may comprise detection of wireless charging capability for the electronic device; the functional region may comprise wireless charging capability. See FIG. 24. According to an exemplary embodiment as indicated schematically in FIGS. 4A-4F and 24, upon detection of an electronic device with wireless charging capability the functional region may be configured (a) to present the receptacle for the electronic device and (b) to provide wireless charging for the electronic device; illumination may be configured for a first pattern when the first form may be presented and for a second pattern when the second form may be presented; illumination may be configured to present an indication of detection of the object; illumination may be configured to present an indication of absence of the object. See also FIGS. 1F, 3C and 24.

According to an exemplary embodiment as indicated schematically in FIGS. 23 and 24, the control system may be configured to initiate the cycle for the functional region upon detection of the object; the control system may be configured to monitor the sensor. See also FIG. 25. According to an exemplary embodiment as indicated schematically in FIGS. 3A-3F, 23, 24 and 25, the control system may be configured to control the actuator; the control system may be configured to control the actuator at the direction of a sensor configured to detect an object. According to an exemplary embodiment as indicated schematically in FIG. 23, the control system may comprise a controller.

According to an exemplary embodiment as indicated schematically in FIGS. 1F, 3A-3F and 4A-4F, the control system may be configured to provide a first illumination when the object may be in a first state and a second illumination when the object may be in a second state: the first state may comprise the object adjacent to a segment of the functional region and the second state may comprise the object at the segment of the functional region. See also FIG. 24.

According to an exemplary embodiment shown schematically in FIGS. 2M-2V, 10A-10H, 14A-14D, 16A-16D, 17A-17C, 19A-19F, 20A-20B and 22A-22D, a component for a vehicle interior may comprise a base structure comprising a functional region; the functional region may be configured to present a first form and a second form; the base structure may be configured to occupy a default volume in the vehicle interior; the second form may comprise an enlarged volume larger than the default volume and/or the second form may comprise a reduced volume smaller than the default volume. Compare FIGS. 10A-10H with FIGS. 17A-17C. As indicated schematically, the first form may comprise the default volume; the first form may comprise a first shape for the base structure and the second form may comprise a second shape for the base structure; the functional region may comprise an adaptive volume mechanism. See FIG. 24. According to an exemplary embodiment as indicated schematically in FIGS. 2M-2V, the functional region may be in the default form when not in use.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A component for a vehicle interior configured to provide a movable support surface for an object comprising:
   (a) a base comprising an outer surface;
   (b) a support configured to provide the movable support surface and to be movable between a raised position and a lowered position; and
   (c) a mechanism configured to move the support between the raised position and the lowered position;
   wherein the support and the base are configured to provide a cavity with the movable support surface for the object below the outer surface of the base when the support is in the lowered position;
   wherein the support and the base are configured to provide a continuous surface when the support is in the raised position;
   wherein the mechanism comprises a pneumatic actuator.

2. The component of claim 1 wherein the mechanism comprises at least one air bladder configured to at least one of (a) expand to move the support; (b) contract to move the support.

3. The component of claim 2 wherein the at least one air bladder comprises a first air bladder and a second air bladder.

4. The component of claim 3 wherein the first air bladder is configured to contract to move the support from the raised position to the lowered position.

5. The component of claim 3 wherein the second air bladder is configured to expand to move the support from the raised position to the lowered position.

6. The component of claim 2 wherein the at least one air bladder comprises a first upper air bladder, a second upper air bladder, a first lower air bladder and a second lower air bladder.

7. The component of claim 6 wherein the first upper air bladder and the second upper air bladder are configured to contract to move the support from the raised position to the lowered position; wherein the first lower air bladder and the second lower air bladder are configured to expand to move the support from the raised position to the lowered position.

8. The component of claim 6 wherein the first upper air bladder is configured to contract and the second lower air bladder is configured to expand to rotate the support relative to the base as the support descends into the base.

9. A component for a vehicle interior comprising:
(a) a base comprising an outer surface;
(b) a support comprising an outer surface and configured to move between a raised position and a lowered position;
wherein the outer surface of the support and the outer surface of the base comprise a substantially continuous surface when the support is in the raised position;
wherein the support comprises a front portion and a rear portion;
wherein the support is configured for a tilted position with the rear portion of the support descended into the base and the front portion of the support extending from the base;
wherein the support is configured to move between at least one of (1) the raised position and the tilted position; and (2) the lowered position and the tilted position.

10. The component of claim 9 further comprising a first actuator; a second actuator and a bracket coupled to the support, the first actuator and the second actuator; wherein the first actuator and the second actuator are configured to (a) rotate the bracket to rotate the support; (b) translate the bracket to translate the support.

11. The component of claim 9 further comprising a first actuator; a second actuator; a bracket coupled to the support, the first actuator and the second actuator; a cover; a frame and a gasket coupled to the frame.

12. The component of claim 11 wherein the cover and the gasket are configured to move with the support and the bracket relative to the frame.

13. The component of claim 11 wherein the support is configured to extend through at least one aperture in the cover and at least one aperture in the gasket to couple with the bracket.

14. The component of claim 9 further comprising an actuator configured to operate a mechanism; wherein the mechanism comprises a bladder.

15. A component for a vehicle interior comprising:
(a) a base comprising an outer surface;
(b) a support comprising an outer surface and configured to move between a raised position and a lowered position; and
(c) a mechanism configured to move the support between the raised position and the lowered position;
wherein the outer surface of the support and the outer surface of the base comprise a continuous surface when the support is in the lowered position;
wherein the outer surface of the support and the outer surface of the base comprise a continuous surface when the support is in the raised position;
wherein the support is configured to protrude from the base when the support is in the raised position;
wherein the mechanism comprises at least one air bladder.

16. The component of claim 15 wherein the at least one air bladder is configured to at least one of (a) expand to move the support; (b) contract to move the support.

17. The component of claim 15 wherein the at least one air bladder comprises a first air bladder and a second air bladder.

18. A component for a vehicle interior comprising:
(a) a base comprising an outer surface;
(b) a support comprising an outer surface;
wherein the support comprises a front portion and a rear portion;
wherein the support is configured to move (1) between a raised position and a lowered position and (2) to a tilted position;
wherein the outer surface of the support and the outer surface of the base comprise a continuous surface when the support is in the raised position;
wherein a cavity is formed within the base when the support is in the tilted position.

19. The component of claim 18 wherein the front portion of the support is elevated relative to the rear portion of the support when the support is in the tilted position.

20. The component of claim 18 wherein the front portion of the support is elevated relative to the outer surface of the base when the support is in the tilted position.

* * * * *